US008645710B2

(12) United States Patent
Ueda et al.

(10) Patent No.: US 8,645,710 B2
(45) Date of Patent: Feb. 4, 2014

(54) INFORMATION PROCESSING APPARATUS, INFORMATION STORAGE MEDIUM, CONTENT MANAGEMENT SYSTEM, DATA PROCESSING METHOD, AND COMPUTER PROGRAM

(75) Inventors: Kenjiro Ueda, Kanagawa (JP); Tateo Oishi, Saitama (JP); Yoshitomo Osawa, Kanagawa (JP); Katsumi Muramatsu, Tokyo (JP); Motoki Kato, Kanagawa (JP); Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 1319 days.

(21) Appl. No.: 11/574,651

(22) PCT Filed: Aug. 30, 2005

(86) PCT No.: PCT/JP2005/015812
§ 371 (c)(1),
(2), (4) Date: Jun. 26, 2007

(87) PCT Pub. No.: WO2006/025414
PCT Pub. Date: Mar. 9, 2006

(65) Prior Publication Data
US 2008/0016576 A1    Jan. 17, 2008

(30) Foreign Application Priority Data

Sep. 2, 2004  (JP) ............................... P2004-255153

(51) Int. Cl.
*G06F 21/00*   (2013.01)
(52) U.S. Cl.
USPC .............................. 713/187; 713/180; 726/26
(58) Field of Classification Search
USPC .................................................. 713/180, 187
See application file for complete search history.

(56) References Cited

U.S. PATENT DOCUMENTS

| 5,371,499 | A | * | 12/1994 | Graybill et al. | .................. | 341/51 |
| 5,999,622 | A | * | 12/1999 | Yasukawa et al. | .............. | 705/51 |
| 6,959,384 | B1 | * | 10/2005 | Serret-Avila | .................. | 713/176 |

(Continued)

FOREIGN PATENT DOCUMENTS

| EP | 1 418 703 | 5/2004 |
| JP | 11-3567 | 1/1999 |

(Continued)

OTHER PUBLICATIONS

Haitsma et al., "Robust Audio Hashing for Content Identification", 2001, 8 pages.*

(Continued)

*Primary Examiner* — Taghi Arani
*Assistant Examiner* — Thaddeus Plecha
(74) *Attorney, Agent, or Firm* — K&L Gates LLP

(57) ABSTRACT

A configuration for achieving efficient content verification processing based on hash values is provided. Hash values of hash units set as segmented data of a content stored on an information storage medium are recorded in a content hash table and are stored on the information storage medium together with the content. An information processing apparatus for executing content playback executes hash-value comparison processing based on one or more randomly selected hash values. Regardless of the data amount of content, the configuration can perform hash-value determination and comparison processing based on hash units having a small amount of data, so that user equipment for executing content playback can perform efficient content verification.

22 Claims, 27 Drawing Sheets

(56) References Cited

U.S. PATENT DOCUMENTS

| | | |
|---|---|---|
| 2002/0112163 A1 | 8/2002 | Ireton |
| 2003/0084298 A1* | 5/2003 | Messerges et al. ........... 713/176 |
| 2003/0086361 A1* | 5/2003 | Sellers et al. ................ 369/276 |
| 2004/0052377 A1* | 3/2004 | Mattox et al. ................ 380/277 |
| 2004/0105545 A1* | 6/2004 | Khandelwal et al. ......... 380/232 |
| 2005/0052971 A1* | 3/2005 | Katata ........................ 369/47.21 |
| 2006/0277415 A1* | 12/2006 | Staring et al. ................ 713/193 |
| 2011/0119493 A1* | 5/2011 | Nonaka et al. ................ 713/176 |

FOREIGN PATENT DOCUMENTS

| | | |
|---|---|---|
| JP | HEI 11-003567 | 1/1999 |
| JP | 2001-127988 | 5/2001 |
| JP | 2001-167518 | 6/2001 |
| JP | 2001-203686 | 7/2001 |
| JP | 2001-282619 | 10/2001 |
| JP | 2002-358011 | 12/2002 |
| WO | 01/82267 | 11/2001 |

OTHER PUBLICATIONS

"Advanced Access Content System (AACS): Pre-recorded Video Book", Apr. 2005, 38 pages.*

Japanese Office Action issued on May 18, 2010, corresponding to Japanese Patent Appln. No. 2004-255153.

* cited by examiner

FIG. 3

| INDICES, SUCH AS TITLES, DISTINGUISHABLE IN APPLICATION LAYER | CONTENT MANAGEMENT UNITS (CPS) | UNIT KEYS (CPS) |
|---|---|---|
| TITLE 1 | CPS1 | Ku1 |
| TITLE 2 | CPS1 | Ku1 |
| APPLICATION 1 | CPS2 | Ku2 |
| APPLICATION 2 | CPS3 | Ku3 |
| . . | . . | . . |
| DATA GROUP 1 | CPS4 | Ku4 |
| DATA GROUP 2 | CPS5 | Ku5 |
| . . | . . | . . |

FIG. 12

(A)
```
Hash Table for Clip(n)( ){                                          #bytes
    NH: Number of All Hash Units in Clip (n)                          4
    Number of CPS Unit to which Clip (n) Belongs                      2
    for (i = 0; i<NH; i++ ){
        Hash Value(i)                                                 8
    }
}
```

(B)
```
Association Table ( ){                                              #bytes
    NC: Number of All Clip Files                                      2
    NH: Number of All Hash Units                                      4
    for (i = 0; i<NC; i++) {
        Number of Front-End Hash Unit of Clip (i)                     4
        Number given to File Name of Clip (i)                         4
    }
}
```

FIG. 16

| | #bits | value |
|---|---|---|
| Li_MSTBL.DAT( ){ | | |
| UD_START_Location | 32 | |
| UD_END_Location | 32 | |
| CHT_Location | 32 | |
| CHT_Offset | 32 | |
| Content_Cert_Location | 32 | |
| Content_Cert_Offset | 32 | |
| UK_Inf_Location | 32 | |
| UK_Inf_Offset | 32 | |
| Num_of_UK | 32 | |
| MFK_Cert_Location | 32 | |
| MKB_Location | 32 | |
| For ( j = 1; j =<N, j++ ) { | | |
|   Encryption_Flag(j) | 8 | $00_{16}$ : not to-be-encrypted<br>$01_{16}$ : to-be-encrypted |
|   Data_Type(j) | 8 | $01_{16}$ : 1st sector of AU<br>$02_{16}$ : 2nd sector of AU<br>$03_{16}$ : 3rd sector of AU |
|   CPS_Unit_No(j) | 16 | $0000_{16}$-$FFFF_{16}$ |
|   Clip_AV_File_No(j) | 24 | 00000-99999 |
|   Reserved | 6 | $000000_2$ |
|   Last_Sector_of_Clip(j) | 1 | $0_2$ : not Last Sector of each Clip<br>$1_2$ : Last Sector of each Clip |
|   Last_Sector_of_Layer(j) | 1 | $0_2$ : not Last Sector of each Clip in layer i<br>$1_2$ : Last Sector of each Clip in each layer i |
|   } | | |
| } | | |

FIG. 17

UD_START_Location : Physical Sector Number of Starting Point of User Data (Data Zone) on Each Layer.
UD_END_Location : Physical Sector Number of End Point of User Data (Data Zone) on Each Layer.
CHT_Location : Physical Sector Number of Starting Point of CHT.
CHT_Offset : Number of Bytes from Starting Point of CHT to Point Immediately before Hash Value (Data Filled with Mastering Facility).
Content_Cert_Location : Physical Sector Number of Starting Point of Content Certificate.
Content_Cert_Offset : Number of Bytes from Starting Point of Content Certificate to Point Immediately before Content ID (Data Filled with Mastering Facility).
UK_Inf_Location : Physical Sector Number of Starting Point of Unit_Key.Inf (See P2). When Unit_Key.Inf is not Recorded on the Layer, $00000000_{16}$ is Written.
UK_Inf_Offset : Number of Bytes from Starting Point of Unit_Key.Inf to Point Immediately before Encrypted Unit Key for CPS Unit #1. When Unit_Key.Inf is not Recorded on the Layer, $00000000_{16}$ is Written.
Num_of_UK : Number of Unit Keys of Entire Disc (Number of CPS Units).
MFK_Cert_Location : Physical Sector Number of Starting Point of MF Key Certificate. Size is Fixed. When MFK_Cert is not Recorded on the Layer, $00000000_{16}$ is Written.
MKB_Location : Physical Sector Number of Starting Point of MKB. When MKB_Cert is not Recorded on the Layer, $00000000_{16}$ is Written.
N : Number of Logical Sectors on Layer i.
Encryption_Flag : Flag Indicating whether or not to Perform Encryption.
Data_Type : Flag Indicating Sector Type.
CPS_Unit_No : CPS Unit Number.
Clip_AV_File_No : Clip File Number. Information used for Creating CHT.
Last_Sector_of_Clip : Flag Indicating Last Sector of Each Clip (on Any Layer).
Last_Sector_of_Layer : Flag Indicating Last Sector of each Clip on each Layer.

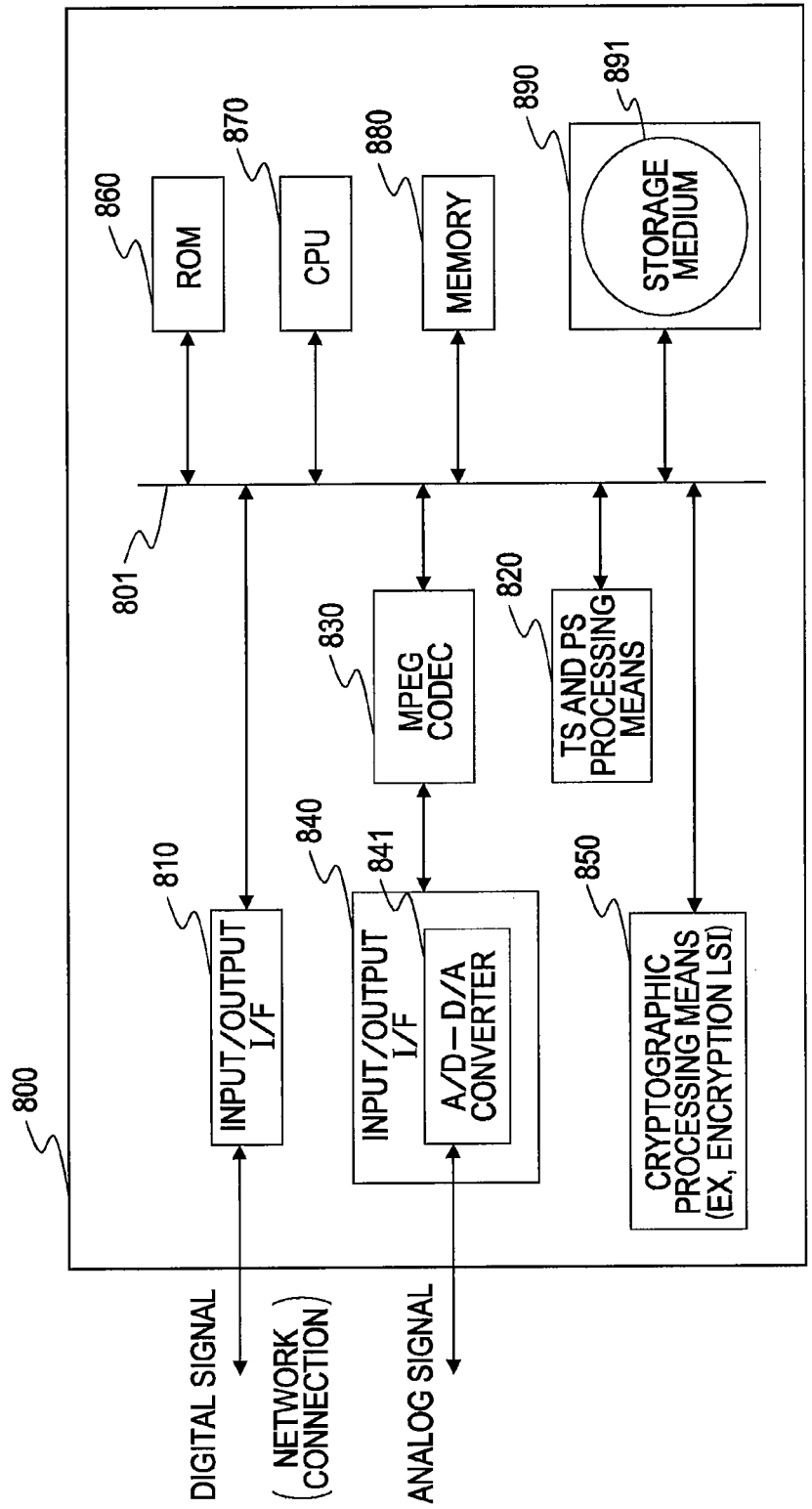

INFORMATION PROCESSING APPARATUS, INFORMATION STORAGE MEDIUM, CONTENT MANAGEMENT SYSTEM, DATA PROCESSING METHOD, AND COMPUTER PROGRAM

CROSS REFERENCES TO RELATED APPLICATIONS

The present application claims priority to Japanese Patent Application JP 2004-255153, filed in the Japanese Patent Office on Sep. 2, 2004, the entire contents of which being incorporated herein by reference.

BACKGROUND

The present application relates to information processing apparatuses, information storage media, content management systems, data processing methods, and computer programs. More specifically, the present application relates to an information processing apparatus, an information storage medium, a content management system, a data processing method, and a computer program which can achieve management for each segmented data unit of various contents requiring content use management and which can efficiently and reliably execute checking of content tampering.

Various types of software data (which are hereinafter referred to as "contents (content)"), such as audio data of music and so on, image data of movies and so on, game programs, and various application programs, can be stored, as digital data, in a storage medium. Examples of the storage medium include a Blu-ray disc using a blue laser, a DVD (digital versatile disc), an MD (mini disc), and a CD (compact disc). In particular, a Blu-ray disc using a blue laser is a high-density recordable disc and can record a large amount of video content as high-quality data.

Digital contents are stored in various information storage media (storage media) as described above and are supplied to users. The users use their own playback apparatuses, such as PCs (personal computers) and disc players, to play back and use the content.

For many contents, such as music data and image data, the creators or sellers thereof generally have distributorships and so on. Thus, for distributing the contents, generally, a certain use restriction is applied, that is, only authorized users are permitted to use the contents, to prevent unauthorized copying and so on.

The use of a digital recording apparatus and a storage medium allows recording and playback to be repeatedly performed without deterioration of, for example, video and audio. Thus, there are problems in that distribution of unauthorized copied contents through the Internet, circulation of the so called "pirated discs", i.e., CD-R discs and so on containing copied contents, and use of copied contents stored on the hard disks of PCs and so on are rampant.

DVDs or large-capacity storage media, such as storage media utilizing a blue laser, that are under development in recent years allow a large amount of data of, for example, one to several movies to -be recorded as digital information to one medium. As the recording of video information and so as digital information becomes available, prevention of unauthorized copying and protection of copyright holders become increasingly important issues. Today, in order to prevent such unauthorized copying of digital data, various technologies for preventing illegal copying are actually incorporated into digital recording apparatuses and storage media.

For example, DVD players employ a content scramble system (content scramble system). In the content scramble system, video data, audio data, and so on are encrypted and are recorded to a DVD-ROM (read only memory) and a key used for decrypting the encrypted data is given to a licensed DVD player. The license is given to a DVD player designed to comply with predetermined operating rules specifying that, for example, no unauthorized copying is to be made. Thus, the licensed DVD player uses the given key to decrypt the encrypted data recorded in the DVD-ROM, thereby making it possible to play back video and audio from the DVD-ROM.

On the other hand, since a DVD player that does not have the license does not have a key for decrypting the encrypted data, it cannot decrypt the encrypted data recorded in the DVD-ROM. In this manner, in the configuration of the content scramble system, DVD players that do not satisfy conditions required for the licensing cannot play back the DVD-ROM in which the digital data is recorded, thereby preventing unauthorized copying.

As one scheme for eliminating unauthorized content use, a control configuration in which the presence/absence of content tampering is checked is proposed for an information processing apparatus (playback apparatus) for executing content playback. In the scheme, the content playback is permitted only when it is confirmed that the content is not tampered, and the content playback is executed when it is determined that the content has been tampered.

For example, Patent Document 1 discloses a control configuration in which hash values are calculated from a content file to be played back and are compared with prepared comparison hash values, i.e., with comparison hash values pre-calculated based on legitimate content data. When newly determined hash values match the comparison hash values, it is determined that the content has not been tampered and the process proceeds to content playback processing.

However, when processing for determining hash values based on a content is executed as described above and the amount of content data serving as source data for determining the hash values is large, a processing load and the amount of processing time required for the calculation become enormous. Today, as the quality of moving image data is enhanced, cases in which a data amount of several gigabytes to several tens of gigabytes per one content are increasing. When hash-value determination processing for a content based on a large amount of data is performed by user equipment for executing content playback, there are problems in that a data processing capability required for the user equipment is increased, the amount of time required for the content verification increases, and content playback processing cannot be efficiently performed.

[Patent Document 1] Japanese Unexamined Patent Application Publication No. 2002-358011

SUMMARY

An information storage medium, a content management system, a data processing method, and a computer program which allow content-tampering checking processing to be efficiently executed during use of a content stored on an information storage medium in which various contents that requires use management, such as copyright management, are stored is provided according to an embodiment of the present application.

An information processing apparatus, an information storage medium, a content management system, a data processing method, and a computer program which efficiently and reliably perform tampering checking processing and achieve content use management for each segmented unit of contents stored on an information storage medium is provided according to another embodiment.

A first aspect of the present application provides an information processing apparatus for executing processing for playing back a content from an information storage medium. The information processing apparatus includes:

content verifying means for verifying legitimacy of the content; and content playback means for executing content playback processing, provided that the legitimacy of the content has been confirmed based on the verification performed by the content verifying means.

The content verifying means has a configuration for executing content verification processing in which the legitimacy of the content is confirmed provided that: n hash units (where n is an integer of 1 or greater) set as segmented data of the content recorded on the information storage medium are selected; hash values determined based on the selected hash units are compared with comparison hash values stored on the information storage medium; and the hash values of all the selected n hash units match the comparison hash values.

Additionally, in one example of the information processing apparatus of the present application, the content verifying means obtains the number (HN) of hash units, stored on the information storage medium, from data recorded in a content hash table stored on the information storage medium; randomly selects a numeric value x, where x≤HN; and associates the selected numeric value x with a hash unit number of the hash unit stored on the information storage medium to execute processing for selecting the hash unit to be subjected to the comparison processing.

Additionally, in one example of the information processing apparatus of the present application, the content verifying means has a configuration for executing processing for determining hash values based on hash units that are data included in an encrypted content stored on the information storage medium.

Additionally, in one example of the information processing apparatus of the present application, the content verifying means executes processing for decrypting the selected hash units, executes determination of hash values based on the decrypted hash units, and executes processing for comparing the determined hash values with the comparison hash values stored on the information storage medium.

Additionally, in one example of the information processing apparatus of the present application, for the decryption processing of the selected hash units, the content verifying means obtains a unit key corresponding to a content management unit to which the hash units belong and executes decryption processing using the unit key.

Additionally, a second aspect of the present application provides an information storage medium.

The information storage medium has a configuration in which a content and hash values for hash units set as segmented data of the content are stored.

Additionally, in one example of the information storage medium of the present application, a logical size of the hash unit is set to an integral multiple of a data length of data of an ECC block, which is a unit of data reading of an information processing apparatus for executing playback of the content.

Additionally, one example of the information storage medium of the present application has a configuration in which the content is segmented into clip files set as content files, and of data included in the clip files, positions of at least front-end data of the clip files are recorded so as to match positions of front ends of the ECC blocks.

Additionally, a third aspect of the present application provides a content management system. The content management system has a configuration including a management center for supplying management information for content use management, a content editing entity for performing content editing processing, and an information-storage-medium manufacturing entity for receiving an edited content from the content editing entity and recording the content to an information storage medium.

At least one of the content editing entity and the information-storage-medium manufacturing entity determines hash values for hash units, which are segmented data of the content stored on the information storage medium; and generates, as data to be stored on the information storage medium, a content hash table in which the determined hash values are recorded.

Additionally, in one example of the content management system of the present application, at least one of the content editing entity and the information-storage-medium manufacturing entity has a configuration for generating, data to be stored on the information storage medium, a content certificate in which a hash digest value is recorded, the hash digest value being determined based on the hash values contained in the content hash table.

Additionally, in one example of the content management system of the present application, at least one of the content editing entity and the information-storage-medium manufacturing entity has a configuration for generating an electronic signature based on the data contained in the content certificate and executing processing for attaching the electronic signature to the content certificate.

Additionally, a fourth aspect of the present application provides a data processing method for generating data to be recorded to an information storage medium. The data processing method including:

a recording-data generating step of executing recording-data generation processing for each sector;

a step of storing the generated recording data in a buffer;

a hash-value determining step of determining, when the data stored in the buffer reaches a predetermined amount of data for a hash unit, a hash value based on the data stored in the buffer; and a step of setting the hash value of each hash unit as data to be recorded to the information storage medium, the hash value being determined in the hash-value determining step.

Additionally, in one example of the data processing method of the present application, the data processing method further includes: a step of generating a content hash table in which the hash values of the hash units determined in the hash-value determining step are stored; and a content-certificate generating step of generating, as data to be stored on the information storage medium, a content certificate in which a hash digest value determined based on the hash values stored in the content hash table is recorded.

Additionally, in one example of the data processing method of the present application, the content-certificate generating step includes processing for generating an electronic signature based on data stored in the content certificate and attaching the electronic signature to the content certificate.

Additionally, in one example of the data processing method of the present application, in the recording-data generating step, with reference to an auxiliary file in which a data processing mode for each sector is written and based on the auxiliary file, whether or not encryption for each sector is required is determined an encryption mode is determined.

Data processing in accordance with information of the determination is performed to generate recording data for each sector.

A fifth aspect of the present application provides a data processing method for executing processing for playing back a content from an information storage medium. The data processing method includes:

a content verifying step of verifying legitimacy of the content; and a content playback step of executing content playback processing, provided that the legitimacy of the content has been confirmed based on the verification performed in the content verifying step.

The content verifying step includes a step of executing content verification processing in which the legitimacy of the content is confirmed provided that: n hash units (where n is an integer of 1 or greater) set as segmented data of the content recorded on the information storage medium are selected; hash values determined based on the selected hash units are compared with comparison hash values stored on the information storage medium; and the hash values of all the selected n hash units match the comparison hash values.

Additionally, in one example of the data processing method of the present application, the content verifying step includes a step of obtaining the number (HN) of hash units, stored on the information storage medium, from data recorded in a content hash table stored on the information storage medium; of randomly selecting a numeric value x, where x≤HN; and of associating the selected numeric value x with a hash unit number of the hash unit stored on the information storage medium to execute processing for selecting the hash unit to be subjected to the comparison processing.

Additionally, in one example of the data processing method of the present application, the content verifying step includes a step of executing processing for determining hash values based on hash units that are data included in an encrypted content stored on the information storage medium.

Additionally, in one example of the data processing method of the present application, the content verifying step includes a step of executing processing for decrypting the selected hash units, executing determination of hash values based on the decrypted hash units, and executing processing for comparing the determined hash values with the comparison hash values stored on the information storage medium.

Additionally, in one example of the data processing method of the present application, for the decryption processing of the selected hash units, the content verifying step includes a step of obtaining a unit key corresponding to a content management unit to which the hash units belong and of executing decryption processing using the unit key.

A seventh aspect of the present application provides a computer program for causing a computer to execute processing for generating data to be recorded to an information storage medium.

The computer program includes:

a recording-data generating step of executing recording-data generation processing for each sector;

a step of storing the generated recording data in a buffer;

a hash-value determining step of determining, when the data stored in the buffer reaches a predetermined amount of data for a hash unit, a hash value based on the data stored in the buffer; and a step of setting the hash value of each hash unit as data to be recorded to the information storage medium, the hash value being determined in the hash-value determining step.

An eighth aspect of the present application provides, a computer program for causing a computer to execute processing for playing back a content from an information storage medium.

The computer program includes:

a content verifying step of verifying legitimacy of the content; and a content playback step of executing content playback processing, provided that the legitimacy of the content has been confirmed based on the verification performed in the content verifying step.

The content verifying step includes a step of executing content verification processing in which the legitimacy of the content is confirmed provided that: n hash units (where n is an integer of 1 or greater) set as segmented data of the content recorded on the information storage medium are selected; hash values determined based on the selected hash units are compared with comparison hash values stored on the information storage medium; and the hash values of all the selected n hash units match the comparison hash values.

The computer program of the present application can be supplied to, for example, a general-purpose computer system that can execute various program codes via a storage media, such as a CD, FD, or MO in a computer-readable format, or through a communication medium, such as a network. Supplying such a program in a computer-readable format can cause a computer to achieve processing according to the program.

Further objects, features, and advantages of the present application will become apparent from more detailed descriptions based on an embodiment described below according to the present application and the accompanying drawings. The term "system" herein refers to a logical combination of a plurality of apparatuses and is not limited to a system in which individual apparatus are included in the same housing.

Advantages

According to the configuration of the present application, hash values are determined for respective hash units set as segmented data of a content stored on an information storage medium and the determined hash values are recorded in content hash tables and are stored on the information storage medium together with the content. An information processing apparatus for executing content playback executes hash-value comparison processing based on one or more hash units randomly selected from a large number of hash units. Thus, regardless of the data amount of the content, it is possible to determine hash values based on hash units whose amount of data is set to be small and it is possible to perform content verification through comparison processing. This configuration eliminates the need to enhance the data processing capability of user equipment that executes content playback, reduces the period of verification processing time until a content is played back, and makes it possible to efficiently verify the content.

In addition, according to the configuration of the present application, each hash unit is set to have an integral multiple of the data length of data of an ECC block, which is a unit of data reading of the information processing apparatus for executing content playback. Thus, the hash-unit reading can be realized by reading a smaller amount of data and data can be verified with high processing efficiency.

Additional features and advantages of the present application are described in, and will be apparent from, the following Detailed Description and the figures.

BRIEF DESCRIPTION OF THE FIGURES

FIG. 3 shows an example of the structure of a content management unit and a unit-key management table.

FIG. 12 is a diagram illustrating an example of the structure of a content hash table for a clip.

FIG. 16 shows data of an auxiliary file used for performing processing for encrypting a content to be stored on the information storage medium.

FIG. 17 shows the syntax of the auxiliary file used for performing processing for encrypting the content stored on the information storage medium.

FIG. 27 is a diagram illustrating an example of the configuration of an information processing apparatus, into which the information storage medium is loaded, for executing information recording/playback.

DETAILED DESCRIPTION

Details of an information processing apparatus, an information storage medium, a content management system, a data processing method, and a computer program according to the present application will be described below with reference to the drawings. The description will be given in accordance with the following points.

1. Structure of Data Stored in Information Storage Medium
2. Encryption of Stored Content and Use Management Configuration
3. Details of Data Recording Structure, Encryption Structure, and Content Hash of Information Storage Medium
4. Details of Manufacture of Information Storage Medium and Data Storage Processing
5. Verification Processing using Content Hash in Content Playback Processing
6. Unit-Key Generation, Content Decryption, and Playback Processing
7. Configuration Example of Information Processing Apparatus

[1. Structure of Data Stored in Information Storage Medium]

Figure 1:
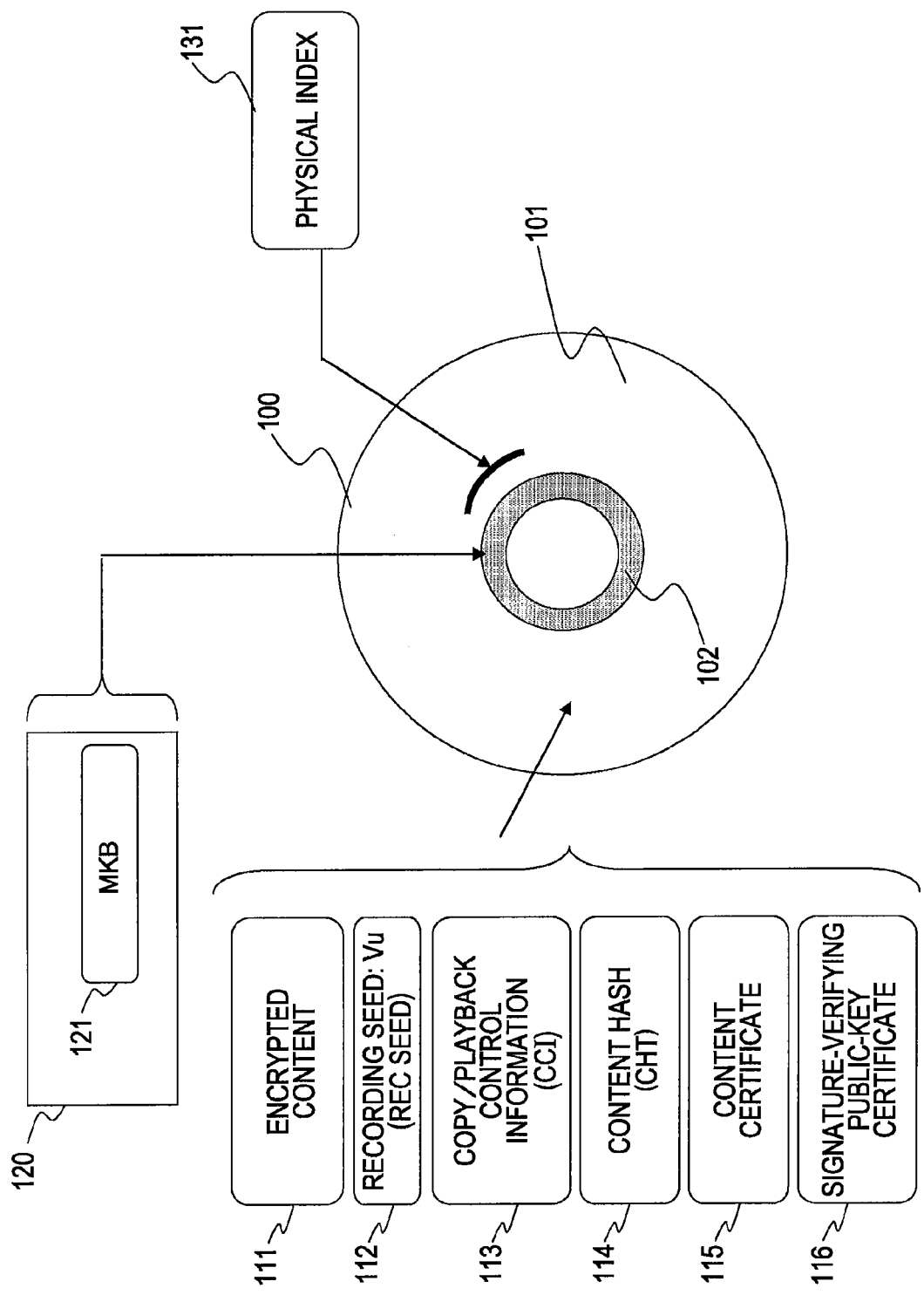
FIG. 1 is a diagram illustrating the structure of data stored on an information storage medium.

First, the structure of data stored on an information storage medium will be described. FIG. 1 shows an example of an information storage medium in which contents are stored, processing of the present application being applicable to the information storage medium. What is shown here is an example of information storage of a ROM disc as a disc in which contents are stored.

This ROM disc is an information storage medium, such as a Blu-ray disc or DVD. The ROM disc is manufactured at a disc manufacturing plant under the permission of a content right holder who has a legitimate content copyright or distributorship and thus stores legitimate contents. Although the following embodiment will be given using an example of a disc medium as an example of the information storage medium, the present application is applicable to a configuration using various types of information storage media.

As shown in FIG. 1, an information storage medium 100 has a data storage area 101 for storing data, such as contents, and a lead-in area 102 for storing accompanying information for the disc and the stored contents, key information used for content decryption processing, and so on.

The data storage area 101 stores encrypted contents 111, recording seeds (REC SEED) 112 serving as information required for generating keys used for performing decryption processing on the encrypted contents, CCI (copy control information) 113 serving as copy/playback control information for the contents, content hashes 114 serving as content hash values used for checking content tampering, a content certificate 115 indicating the legitimacy of the contents, and a signature-verifying public key certificate 116 storing a public key used for verifying an electronic signature attached to the content certificate. The content hashes 114 are stored as a content hash table (CHT). Details of the content hash table (CHT) will be described below. The recording seeds (REC SEED) 112, the CCI (copy control information) 113, and the content hashes 114 are used as information for generating cryptographic keys (unit keys) used for encoding and decrypting the contents. A detailed structure will be described below.

The lead-in area 102 stores cryptographic-key information 120 required for generating keys used for performing decryption processing on the encrypted contents 111. The cryptographic-key information 120 contains a media key block (MKB: media key block) 121, which serves as a cryptographic-key block generated based on a tree-structure key-distribution system, which is known as one scheme of a broadcast encryption system. In addition, a physical index (physical index) 131 is recorded on the information storage medium 100. An overview of the various types of information will be described below.

(1) Encrypted Content 111

Various types of content are stored on the information storage medium 100. Examples include main contents, such as an AV (audio visual) stream of a moving-image content, such as an HD (high definition) movie content, and game programs, image files, audio data, and text data in formats defined by specific standards. These contents include data based on a specific AV format standard and are stored according to a specific AV data format. Specifically, for example, for data based on a Blu-ray disc ROM standard, the contents are stored according to a Blu-ray disc ROM standard format.

In addition, for example, game programs, image files, audio data, and text data, and so on, which are service data, may be stored as sub contents. The sub contents are data having a data format that is not compliant with a specific AV data format. That is, the sub contents can be stored as data that does not conform to a Blu-ray disc ROM standard, that is, as data in an arbitrary format that is not compliant with the Blu-ray disc ROM standard format.

The main contents and the sub contents include various types of content, such as music data, image data of moving images, still images, and so on, game programs, and web content. These contents include content information that can be used solely as content from the information storage medium 100 and content information that can be used when data from the information storage medium 100 is combined with data supplied from a server connected through a network.

(2) Recording Seed 112

For content use management, each content or a collection of multiple contents are encrypted using a corresponding individual cryptographic key or keys (unit key(s)) and are stored on the information storage medium 100. That is, for example, an AV stream (audio visual) stream, music data, image data of moving images, still images, and so on, a game program, web content, which are included in the contents, are segmented into units, each serving as a unit of managing content use, and different recording seeds Vu 112 are assigned to the segmented units.

For use of the contents, cryptographic keys (unit keys) corresponding to the respective units are assigned in accordance with a predetermined cryptographic-key generation sequence using the recording seeds Vu 112 and the cryptographic key information 120. A unit to which one unit key is assigned is referred to as a "content management unit (CPS unit)". That is, the encrypted contents 111 are segmented into CPS units, which are encrypted with unit keys corresponding to the respective CPS units and are stored on the information storage medium 100.

(3) Copy/Playback Control Information (CCI) 113

The copy/playback control information (CCI) 113 includes copy restriction information/playback restriction information for use control, the control information (CCI) 113 corresponding to the encrypted contents 111 stored on the information storage medium 100. The copy/playback control information (CCI) 113 can be set in various ways, for example, it can be set as information for an individual CPS unit or can be set for multiple CPS units. Details of the information will be described in a subsequent paragraph.

(4) Content Hash 114

The content hashes 114 have hash values based on data included in a content or an encrypted content stored on the information storage medium 100 and are used to check content tampering. In the configuration of the present application, a clip file that contains AV-stream actual data contained in a CPS unit is segmented, so that hash units, each having a predetermined amount of data (e.g., 192 KB), are set. Further, hash values for the respective hash units are determined, and the hash values for the respective hash units are recorded in the content hash table (CHT) and are stored on the information storage medium.

An information processing apparatus (playback apparatus) for executing playback of a content from the information storage medium determines hash values based on hash units and compares the determined hash values with comparison hash values of corresponding hash units recorded in the content hash table (CHT) stored on the information storage medium. When they match each other, it is determined that the content is not tampered and the operation proceeds to processing for decrypting and playing back the content. When they do not match, it is determined that the content has been tampered, the decryption and playback of the content are terminated. Details of the processing will be described later.

The content hashes are data that are also used as information for generating cryptographic keys used for content encryption processing and decryption processing. Generation and usage of the content hashes 114 will be described in a subsequent paragraph.

(5) Content Certificate

The content certificate is a certificate indicating the legitimacy of a content stored on the information storage medium and contains data, such as a content hash digest based on the comparison hash units stored in the aforementioned content hash table (CHT). An electronic signature is further attached to the content certificate. For example, an electronic signature of an information-storage-medium manufacturing entity, i.e., a disc plant, is attached to the content certificate, so that tamper-proof data is provided. Details of the content certificate will be described in a subsequent paragraph.

(6) Signature-Verifying Public Key Certificate

The signature-verifying public key certificate is a public key certificate that contains a public key used for verifying the electronic signature, which is issued by the information-storage-medium manufacturing entity or the like and is attached to the content certificate.

(7) Physical Index 131

Category information, including disc accompanying information, such as a disc type, and content accompanying information corresponding to contents stored in the data area 101, is recorded in the physical index 131. In addition, in the same manner as the recording seeds 112, key information (key generation information) for generating keys used for performing decryption processing on the encrypted content stored in the data storage area 101 of the information storage medium may be recorded. The configuration may also be such that the physical index 113 is recorded in the lead-in area 102.

(8) Cryptographic Key Information 120

Similar to the above-described recording seeds 112, the cryptographic key information 120 contains a media key block (MKB (media key block)) 121, which is a cryptographic key block for obtaining key information (key generation information) for generating a key used for performing decryption processing on the encrypted content stored in the data storage area 101 of the information storage medium, that is, a cryptographic key block generated based on a tree-structured key distribution system, which is known as one scheme of a broadcast encryption system.

The MKB 121 is a key information block that allows a media key (Km), which is required for content decryption, to be obtained only through processing (decryption) based on a device key stored on an information processing apparatus of a user having a valid license. This allows the key to be obtained only when a user device (information processing apparatus) has a valid license, based on an information distribution system according to a so-called "hierarchical tree structure", and can prevent a user device that has been excluded (i.e., that has been subjected to revoking processing) from obtaining the key (media key). By changing key information contained in the MKB, a management center can generate an MKB having a structure in which decryption cannot be performed with a device key stored in a particular user device, i.e., a media key required for content decryption cannot be obtained. Thus, it is possible to exclude (revoke) an unauthorized device at an arbitrary time and to supply a decryptable encrypted content to only a device having a valid license.

[2. Encryption of Stored Content and Use Management Configuration]

Next, a content management configuration in which contents stored on the information storage medium are segmented and usage controls that differ from each other for the segmented contents are realized will be described with reference to FIG. 2 and the subsequent figures.

As described above, contents to be stored on the information storage medium are assigned keys (unit keys) that are different for individual segmented contents, are encrypted, and are stored in order to realize usage controls that differ from each other for the segmented contents. A unit to which one unit key is assigned is referred to as a "content management unit (CPS unit)".

A corresponding unit key is used to encrypt a content belonging to each unit. For use of the content, the key (unit key) assigned to each unit is obtained to perform playback. The unit keys can be managed independently. For example, a unit key assigned to a unit A is set as a key that is obtainable from the information storage medium. Also, the configurations of obtaining and managing keys for respective units can be independent from each other. For example, a unit key assigned to a unit B can be set as a key that is obtainable, provided that a user accesses a server connected through a network and executes a predetermined procedure.

A scheme for setting a unit to which one key is assigned, i.e., a content management unit (CPS unit), will be described with reference to FIG. 2.

Figure 2:
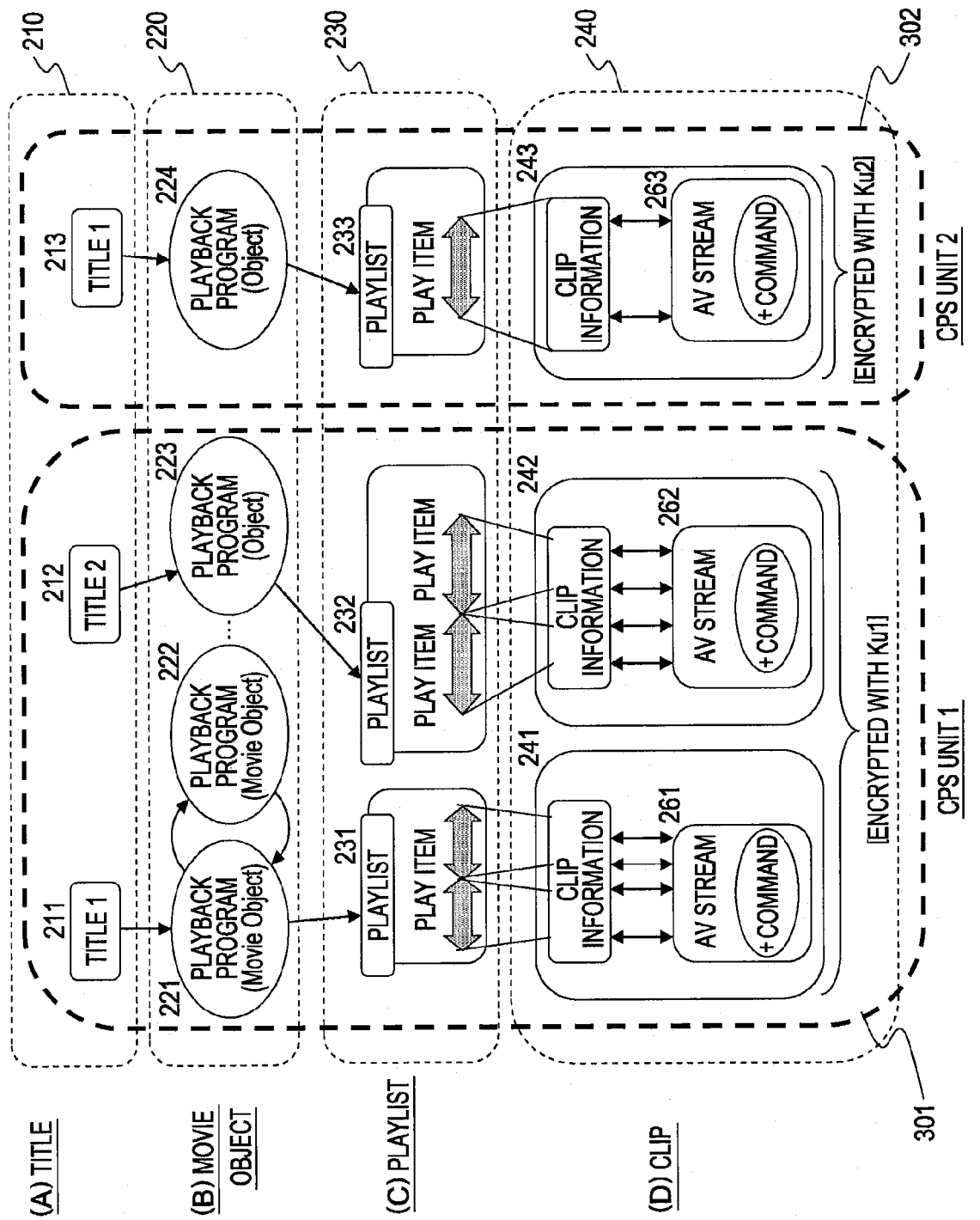
FIG. 2 is a diagram illustrating an example of setting of content-management units set for contents stored on the information storage medium.

As shown in FIG. 2, contents have a hierarchical structure including (A) a title 210, (B) a movie object 220, (C) a playlist 230, and (D) a clip 240. When a title serving as an index file accessed by a playback application is specified, a playback program associated with the title is specified and a playlist specifying a content playback sequence or the like is selected in accordance with program information of the specified playback program. Further, based on clip information specified in the playlist, an AV stream, which is content actual data, or commands are read, and the AV stream is played back or the commands are executed.

FIG. 2 shows two CPS units. These units constitute parts of contents stored on the information storage medium. A CPS unit 1 301 and a CPS unit 2 302 are each set as a unit containing a title or titles serving as an application index or indices, a movie object or objects serving as a playback-program file or files, a playlist or playlists, and a clip or clips containing an AV-stream file or files serving as content actual data.

The content management unit (CPS unit) 1 301 contains a title 1 211, a title 2 212, playback programs 221 and 222, playlists 231 and 232, and clips 241 and 242. AV stream data files 261 and 262, which are content actual data contained in the two clips 241 and 242 are encrypted using a unit key Ku1, which is set in association with the content management unit (CPS unit) 1 301.

The content management unit (CPS unit) 2 302 contains a title 3 213, a playback program 224, a playlist 233, and a clip 243. An AV stream data file 263, which is content actual data contained in the clip 243, is encrypted using a unit key Ku2, which is set in association with the content management unit (CPS unit) 2 302.

For example, in order for a user to execute application-file or content-playback processing for the content management unit 1 301, it is necessary to obtain the unit key Ku1, which is a cryptographic key set in association with the content management unit (CPS unit) 1 301, to perform decryption processing. After the decryption processing is executed, it is possible to play back the content by executing an application program. In order to execute application-file or content-playback processing for the content management unit 2 302, it is necessary to obtain the unit key Ku1, which is a cryptographic key set in association with the content management unit (CPS unit) 2 302, to execute decryption processing.

A playback application program executed by the information processing apparatus for content playback identifies a content management unit (CPS unit) corresponding to a content specified by the user for playback and executes processing for obtaining a CPS cryptographic key corresponding to information of the identified CPS management unit. When a CPS cryptographic key cannot be obtained, for example, a message indicating that playback cannot be performed is displayed. For example, the playback application program also detects switching of content management units (CPS units) during execution of content playback, obtains a necessary key, and displays a message indicating that playback cannot be performed.

The playback application program executes playback management based on a unit-structure and unit-key management table as shown in FIG. 3. As shown in FIG. 3, the unit-structure and unit-key management table is a table in content management units (CPS units) and unit key information, which correspond to indices, application files, or data groups in an application layer, are associated with each other. The playback application program performs management based on the management table.

For example, upon detecting that switching of content management units (CPS units) occurs as a result of switching of application indices, the playback application program switches between keys to be used so as to correspond to the switching of the content management units (CPS units). Alternatively, the playback application program executes processing, such as displaying a message indicating that a unit key needs to be obtained.

For example, in a case in which a playback apparatus that is executing content playback processing has the unit key Ku1 for the content management unit (CPS unit) 1 301 and also has the unit key Ku2 for the content management unit (CPS unit) 2 302, when the playback application program for comprehensively controlling the content playback processing detects switching between applications for units or switching of contents, it performs unit-key switching corresponding to the switching of the content management units (CPS units), that is, performs switching from Ku1 to Ku2.

For example, in a case in which a playback apparatus that is executing content playback processing has the unit key Ku1 for the content management unit (CPS unit) 1 301 and also has the unit key Ku2 for the content management unit (CPS unit) 2 302, when the playback application program for comprehensively controlling the content playback processing detects switching between applications for units or switching of contents, it executes processing such as displaying a message indicating that a unit key needs to be obtained.

[3. Details of Data Recording Structure, Encryption Structure, and Content Hash of Information Storage Medium]

Figure 4:
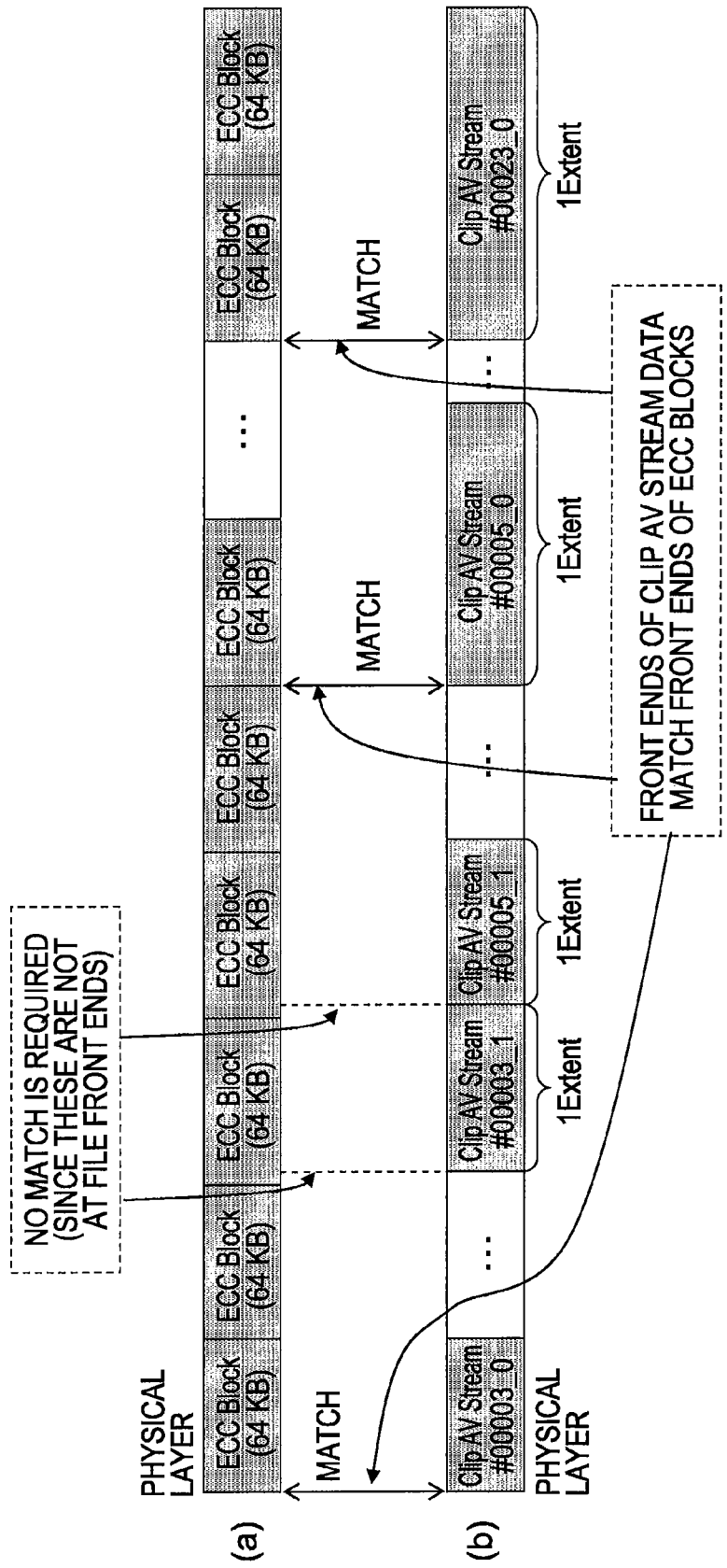
FIG. 4 is a diagram illustrating a data recording structure of the information storage medium and illustrating the relationship between ECC blocks and clip AV streams on physical layers.

Next, details of the data recording structure, the encryption structure, and the content hashes of the information storage medium will be described. First, the relationship of clip files and ECC blocks will be described with reference to FIG. 4. For data stored on the information storage medium, the data is recorded for each ECC block, which is a minimum unit of data recording/playback for a drive for executing content recording/playback. In this example, as shown in FIG. 4(*a*), each ECC block is set to have 64 KB data. FIG. 4(*a*) shows the structure of data recorded on a physical layer, and FIG. 4(*b*) shows clip files that are corresponding contents recorded on the physical layer.

As described above with reference to FIG. 2, a content is set so with each clip file being a unit of management. FIG. 4(*b*) shows an example of a structure in which the following multiple clips are recorded as clip AV streams:

clip No.=#00003,
clip No.=#00005, and
clip No.=#00023.

In the illustrated example, clip files with clips #00001 to #00023 are stored on the information storage medium, and each clip is segmented and the segmented data are recorded as data #000nn_x in a distributed manner in respective contiguous recording areas (Extents) managed by a UDF (universal disc format).

In the data recording structure of the information storage medium of the present application, data [#000nn_0], which are front-end data of the respective clips, that is, the front-end data of AV stream data of the clip files, are all recorded so as to match the front ends of ECC blocks (64 KB) on the physical layer. This is to make it possible to efficiently execute processing, such as reading of hash units set so as to correspond to each clip file and determining hash values from the hash units. Details of the processing will be described in a subsequent paragraph.

In the present embodiment, only data [#000nn_0], which is the front-end data of AV stream data of each clip file, is recorded so as to match the front end of the ECC block (64 KB) on the physical layer, and other subsequent data [#000nn_1-] do not necessary have to match the front ends of the ECC blocks. However, the front ends of all contiguous recording areas (Extents) data may be recorded so as to match the front ends of the ECC blocks. This arrangement makes it possible to more efficiently determine hash values.

Next, the relationship of clip files and hash units will be described with reference to FIG. 5. As described above, the content hashes 114, which are data stored on the information storage medium 100 and described with reference to FIG. 1, have hash values based on data included in a content or an encrypted content stored on the information storage medium 100 and are used to check content tampering. In the configuration of the present application, a clip file that contains AV-stream actual data included in a CPS unit is segmented, so that hash units, each having a predetermined amount of data (e.g., 192 KB), are set. Further, hash values for the respective hash units are determined, and the hash values for the respective hash units are recorded in the content hash table (CHT) and are stored on the information storage medium.

Figure 5:
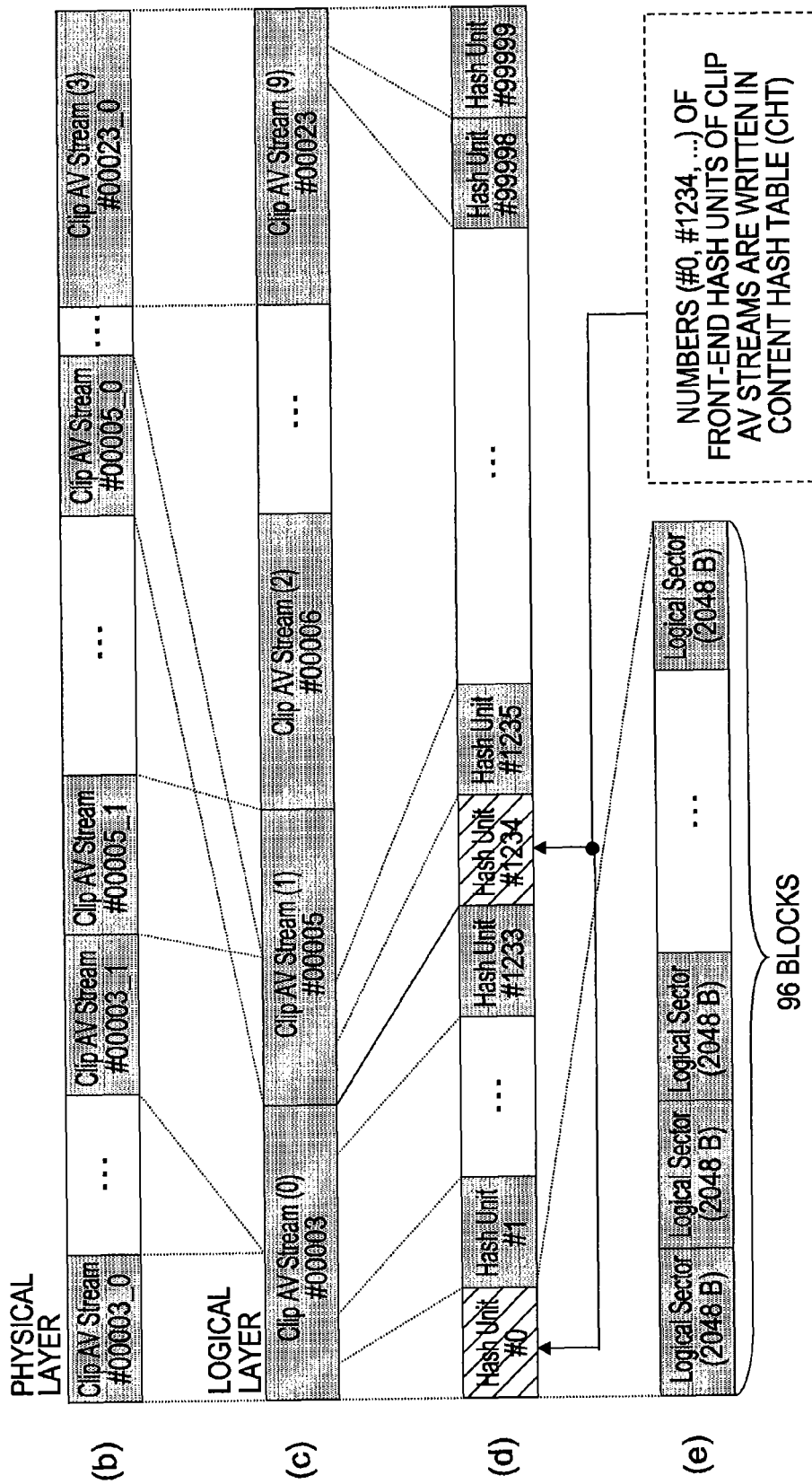
FIG. 5 is a diagram illustrating the data recording structure of the information storage medium and illustrating the relationship of clip AV streams on the physical layer, clip AV streams on a logic layer, and hash units.

(b) shown at the uppermost stage of FIG. 5 shows an arrangement of clip files on the physical layer which correspond to those in (b) shown in FIG. 4. Data included in each clip file is segmented on the information storage medium, as described above, and is recordable in a distributed manner. As shown in FIG. 5(*c*), on the logical layer, the distributed data are managed for each clip file. The playback application in the information processing application for executing content playback processing reads data included in a clip file, recorded on the information storage medium in a disturbed manner, in accordance with an address; configures one clip file on the logical layer; and executes data decryption processing, playback processing, and so on.

The playback application in the information processing apparatus for executing the content playback processing executes content-tampering checking processing. In the content-tampering checking, for example, multiple hash units are randomly selected from a clip file selected as a target for playback, hash values for content data corresponding to the selected hash units are determined, and the determined hash values are compared with values (hash values for comparison) contained in the content hash table (CHT) pre-recorded on the information storage medium. When these hash values match each other, it is determined that the content has not been tampered. The process then proceeds to decryption processing and playback processing of the content. When they do not match, it is determined that the content has been tampered. Thus, the decryption and playback processing of the content is suspended.

As shown in FIG. 5(*d*), the hash units are each set to have an amount (192 KB) of data obtained by segmenting a clip file on the logical layer. As shown in FIG. 5(*e*), each hash unit corresponds to data of 96 logical sectors (2048 B each).

As shown in FIG. 5(*d*), the hash units that are set so as to correspond to the clip files are given hash unit numbers (#0, #1, #2, . . . ). FIG. 5 shows a structure example in which a clip file (#00003) contains hash units #0 to #1233 and a clip file (#00005) contains hash units #1234 . . . .

In the content hash table (CHT) stored on the information storage medium, the hash values (the comparison hash values) of the hash units are contained and the numbers of the front-end hash units of the clip files are recorded. With this arrangement, based on the clip-file front-end hash unit numbers recorded in the content hash table (CHT), the information processing apparatus (playback apparatus) for executing hash-value verification can efficiently select hash units that correspond to a clip to be played back and that are to be verified. Details of the structure of the content hash table (CHT) and processing using the CHT will be described in a subsequent paragraph.

Figure 6:
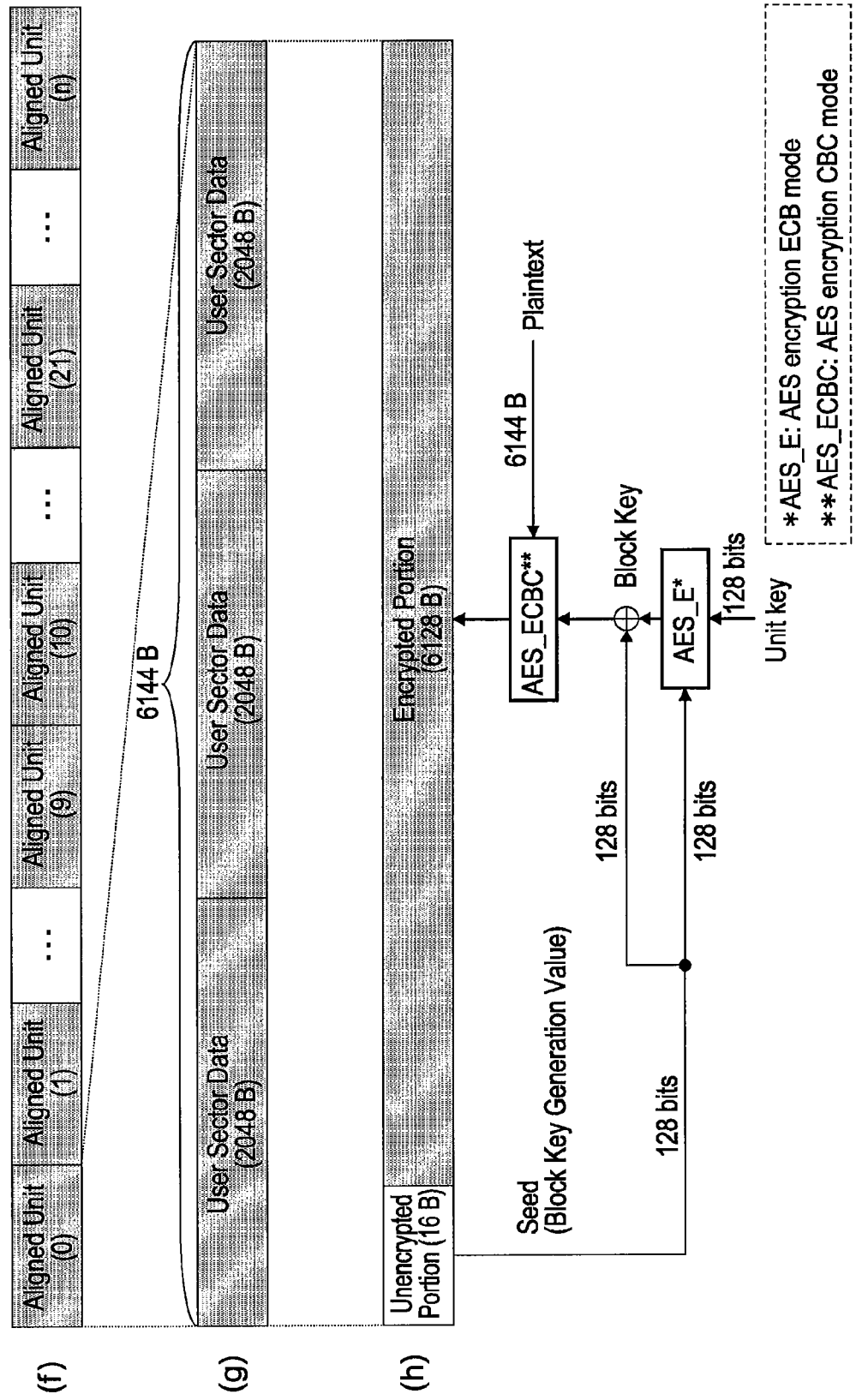
FIG. 6 is a diagram illustrating the data recording structure and an encryption processing configuration of the information storage medium.

FIG. 6 is a diagram illustrating a structure for encryption processing for data stored on the information storage medium. Content encryption is executed for each aligned unit (aligned unit) set as a unit of encryption processing shown in FIG. 6(*f*). As shown in FIG. 6(*g*), one encryption-processing unit (aligned unit) has 6144 B (bytes) consisting of three pieces of sector data (2048 B (bytes) each). One-sector data corresponds to one-sector data shown in FIG. 5(*e*).

As shown in FIG. 6(*h*), one encryption-processing unit (aligned unit) has 16-byte unencrypted portion and a 6128-byte encrypted portion. A seed, which has a block-key generation value, is obtained from the unencrypted portion. The seed and a unit key (unit key), generated based on various types of information, such as a media key obtained from a media key block described with reference to FIG. 1, are subjected to encryption processing (AES_E) and arrangement logical disjunction operation to thereby generate a block key. Encryption processing (AES_ECBC) is then performed on plaintext to generate 6128-byte encrypted data.

The encryption processing using the block key is executed in an AES cryptographic algorithm CBC mode. This encryption processing will be described with reference to FIG. 7.

Figure 7:
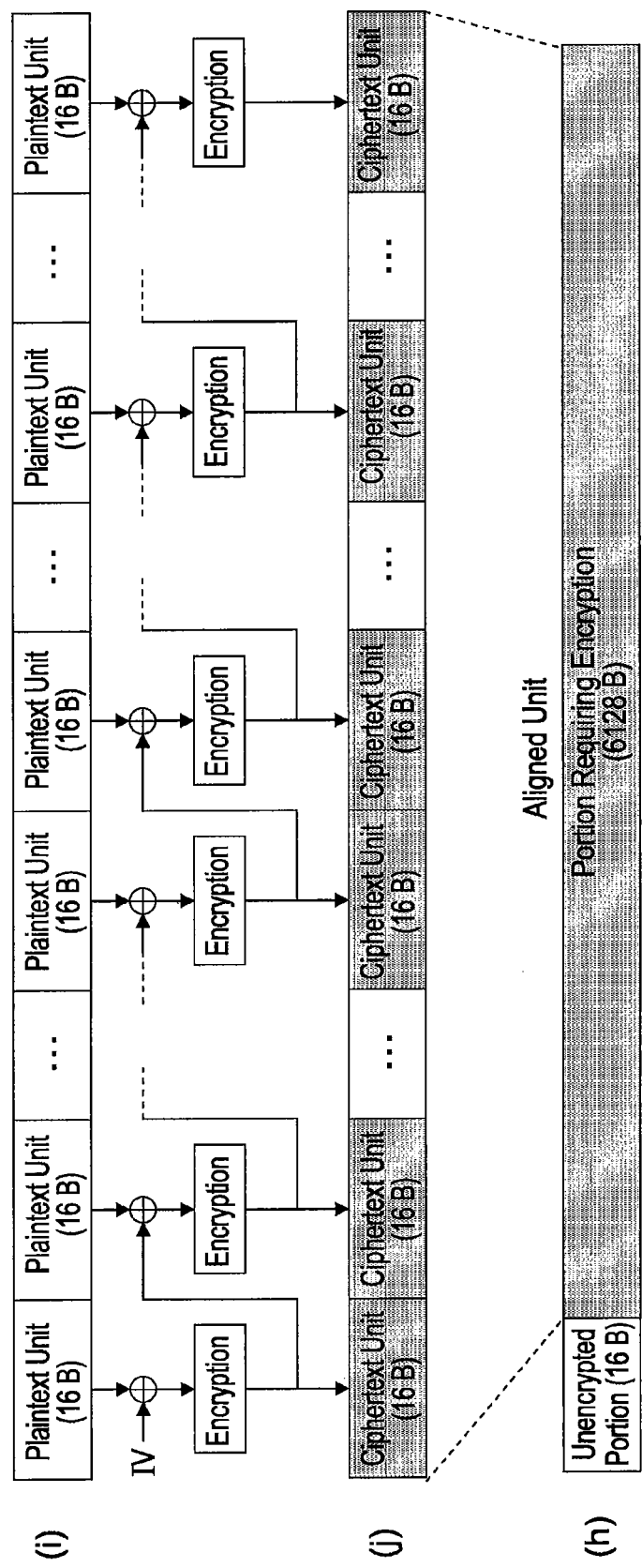
FIG. 7 is a diagram illustrating the encryption processing structure of s content stored on the information storage medium.

FIG. 7(*i*) shows plaintext of a content stored on the information storage medium. The plaintext is divided into blocks each having 16 bytes. Then, processing is repeatedly performed in which each divided block is encrypted through an exclusive disjunction operation section and an encryption section (AES), the resulting data and the subsequent 16-byte data are subjected to exclusive disjunction, and the resulting data is further subjected to AES encryption. Outputs of the encryption sections (AES) are coupled to generate encrypted data shown in FIG. 7(*j*). This encrypted data corresponds to data shown in FIG. 7(*h*) and is identical to the data shown in FIG. 6(*h*). That is, the encrypted data corresponds to the 6128-byte encryption portion, which is one encryption processing unit (aligned unit) consisting of three pieces of sector data each having 2048 bytes. An initial value (IV) subjected to the exclusive disjunction operation processing together with 16 bytes of the front-end plaintext unit is a seed obtained from the unencrypted portion shown in FIG. 6(*h*).

The encrypted data generated as described above is divided into ECC blocks and is recorded on the information storage medium. The information processing apparatus (playback apparatus) for executing content playback processing executes decryption processing similar to that in the CBC mode based on the AES cryptographic algorithm shown in FIG. 7 and executes processing for generating decrypted data (plaintext) from the encrypted data.

Figure 8:
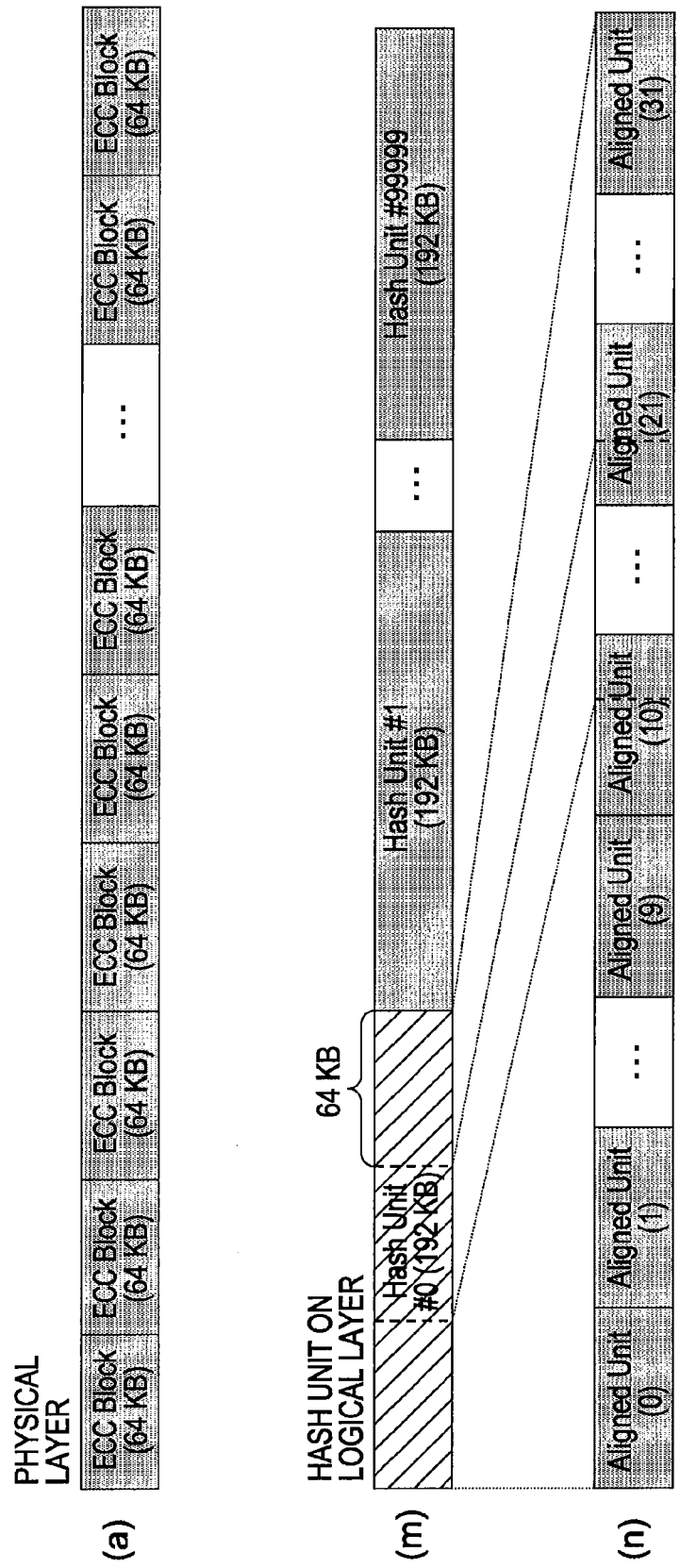
FIG. 8 is a diagram illustrating the data recording structure of the information storage medium and illustrating the relationship between hash units and aligned units.

Next, the relationship between the hash units and an array of ECC blocks recorded on the information storage medium will be described with reference to FIG. 8. FIG. 8(*a*) shows an array of ECC blocks on the physical layer which are similar to those show in FIG. 4(*a*). FIG. 8(*m*) shows an array of hash units on the logical layer. As described with reference to FIG. 5, each hash unit corresponds to data included in any one of the clip files, and each hash unit has a data structure with a predetermined data length (e.g., 192 KB).

Since each hash unit has 192 KB and each ECC block, on the other hand, has 64 KB, one hash unit is set to have the same data length as three ECC blocks. The ECC block is a unit of data-recording/playback processing for a drive. Prior to content playback, the information processing apparatus (playback apparatus) for executing the content playback reads one or more hash units belonging to a content management unit (CPS unit) to be played back, determines a hash value or values, and compare the hash value(s) with the comparison hash value(s) recorded in the content hash table (CHT).

In this case, the drive executes data reading for each ECC block. Logical sectors on the logical layer can be recorded in physical sectors on the physical layer in a distributed manner. However, for example, sector data contained in one clip, i.e., sector data that are contiguous on the logical layer, are also contiguously recorded on the physical layer in many cases.

In the data recording structure of the present application, the front end of each clip file is recorded so as to match the front end of an ECC block on the physical layer, as described above with reference to FIG. 4. In addition, each hash unit (192 KB) is set to have a data length that is an integral multiple (three times) of an ECC block (64 KB). As a result, in many cases, reading of a hash unit is realized by reading three ECC blocks. Consequently, the information processing apparatus for executing hash-value-based data verification can realize data reading processing for hash verification by reading a minimum number of ECC blocks and can perform efficient verification processing.

Each hash unit corresponds to the data of coupled aligned units, each serving as a unit of data processing (a unit of encryption processing), as shown in FIG. 8(*n*). Although the aligned units shown in FIG. 8(*n*) are arranged on the logical layer, an arrangement thereof on the physical layer is in many cases similar to the illustrated arrangement in the data recording structure of the present application.

Figure 9:
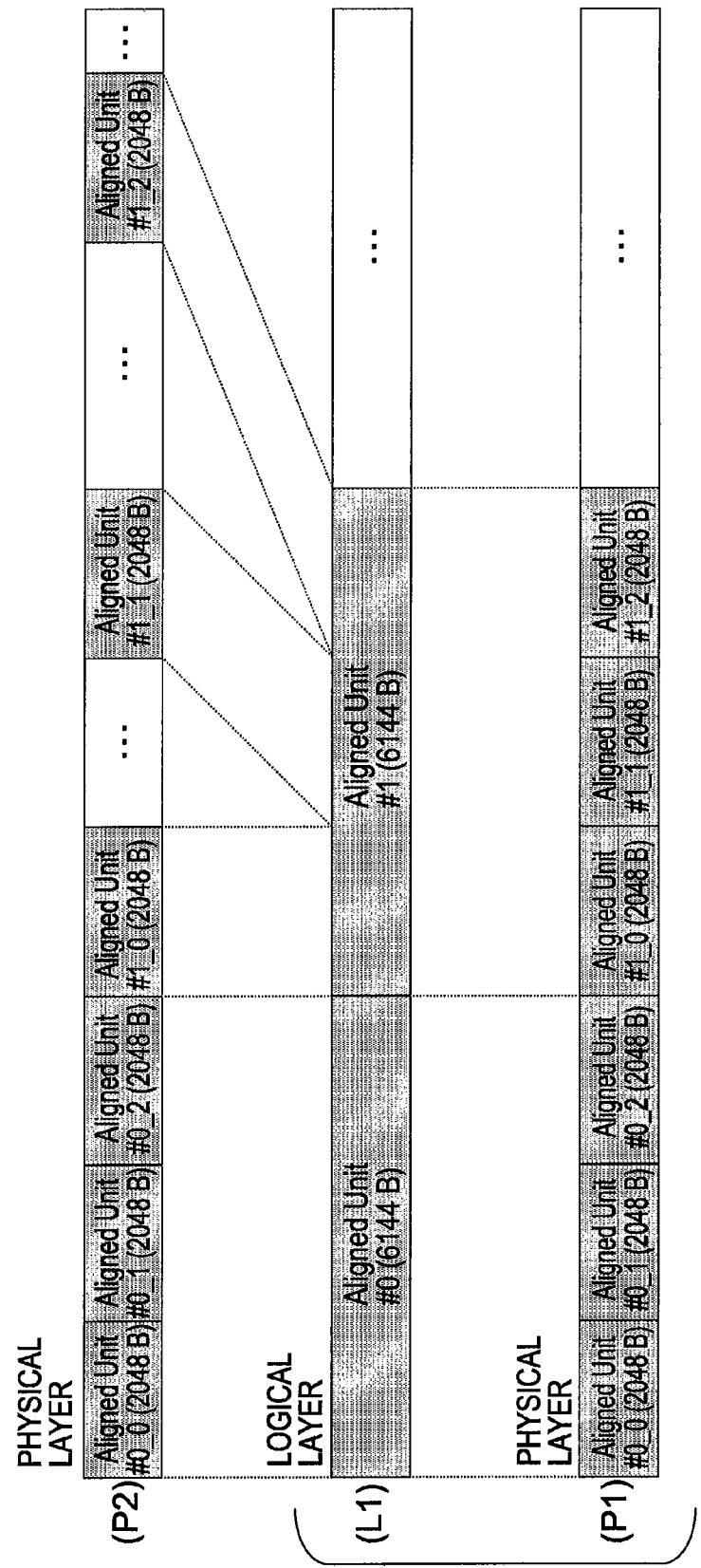
FIG. 9 is a diagram illustrating the data recording structure of the information storage medium and illustrating the relationship between aligned units on the physical layer and aligned units on the logical layer.

The relationship between an arrangement of aligned units on the logical layer, each aligned unit being a unit of data processing (a unit of encryption processing), and an arrangement thereof on the physical layer will be described with reference to FIG. 9. FIG. 9 (L1) shows an arrangement of aligned units on the logical layer. FIG. 9 (P1) shows an arrangement of aligned units on the physical layer when a structure according to the present application is applied. FIG. 9 (L2) at the uppermost stage shows an arrangement of aligned units on the physical layer when conventional data recording processing is performed.

In the structure according to the present application, that is, in the arrangement of aligned units on the logical layer in FIG. 9 (L1) and the arrangement of aligned units on the physical layer shown in FIG. 9 (P1), data of at least the front-end portion of each clip file are arranged so as to match, as shown in the figures. This is because the data recording processing described above with reference to FIG. 4, that is, data recording in which the front end portion of each clip file matches the front end of an ECC block on the physical layer, is performed. Conventionally, such data recording has not been performed. Thus, as shown in FIG. 9 (P2), the aligned units, each being a unit of data processing unit (a unit of encryption processing), are often recorded on the physical layer in a spaced-apart manner. Under a current rule, dividing each logical sector (2048 B) into more sectors is prohibited, but dividing an aligned unit (6144 B=2048 B×3) for each encryption into sectors (2048 B each) is permitted. Consequently, discrete data are often arranged as shown in FIG. 9(P2).

The use of the data recording structure (FIG. 9 (P1)) of the present application not only allows the storage medium to be efficiently accessed during hash determination, but also allows efficient processing to be performed in decryption processing of a content stored on the information storage medium. That is, as shown in FIG. 9 (P2), when aligned units are separately recorded on the physical layer, a process for executing encryption processing during data recording and a process for decryption processing during data playback become inefficient. As described above, the CBC mode is used for encrypting and decrypting a content. A unit of the coupling is 6144 B (=the size of an aligned unit). Thus, encryption and decryption of an aligned unit #X_1 and an aligned unit #X_2 require the last 16 B (a minimum unit of AES) of an aligned unit that (logically) immediately precedes thereto.

That is, as described above with reference to FIG. 7, the encryption processing involves a process for executing an operation (exclusive disjunction) between an operation result of a unit and a contiguous unit. Thus, when the logic sectors of an aligned unit are divided, the last 16 B of an aligned unit #1_0 must be held during access of the discrete data in order to decrypt an aligned unit #1_1. One content contains a large number of aligned units, so that access time for discrete units is accumulated during data recording or playback. Such access latency is accumulated, which results in a decrease in data processing efficiency. In contrast, with an arrangement as shown in FIG. 9 (P1), since the units are contiguously arranged, access during data recording or playback can be continuously executed. Thus, the data access time decreases, which makes it possible to perform efficient processing.

Figure 10:
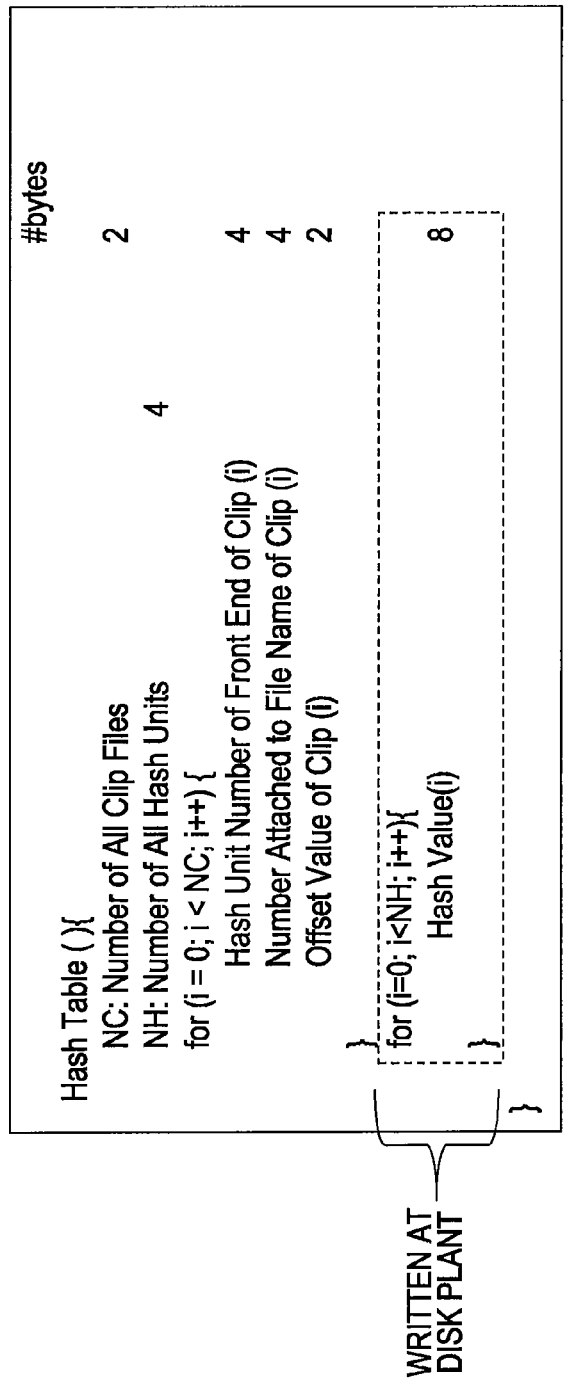
FIG. 10 is a diagram illustrating an example of the structure of a content hash table.

Next, a description is given of an example of the structure of the content hash table (CHT) in which comparison hash values corresponding to hash units, that is, hash values pre-calculated based on legitimate content data, are contained for the respective hash units. FIG. 10 is an example of the data structure of one content hash table (CHT) set for one recording layer (recording layer) of an information recording medium.

What are recorded in the content hash table (CHT) are:
the number (NC) of all clips, and
the number (NH) of all hash units.
Subsequent to the data, for each clip (i),
the hash unit number of the front end of clip (i),
a number corresponding to a file name of clip (i), and
the offset value of clip (i) are recorded.
"Hash Values" serving as hash values (comparison hash values) for respective hash units are further recorded for each clip.

A [Hash value] serving as a hash value (a comparison hash value) for each hash unit is recorded at, for example, a disc plant that executes processing for recording a legitimate content.

For example, when executing content verification involving hash-value determination and comparison processing, the information processing apparatus (playback apparatus) uses the number (NH) of all hash units to obtain a number for a selection range for randomly selecting hash unit numbers. A specific processing example will be described below.

Selection of hash units with respect to the entire hash numbers allows an increase in tamper-detection accuracy. A method in which a clip number is randomly selected from all the clip numbers and hash units are randomly selected from the selected clips may be used without the use of the hash unit numbers. In this case, for example, when "999 extremely-small-sized and tampered clip files" and "one large-sized untampered clip file" are recorded to a disc, the possibility that the tampering is detected is low. However, the use of a configuration in which hash units are selected with respect to all hash numbers can increase the possibility of tamper detection.

For the number of the front end hash unit of clip (i), numbers 0 to NC are given to clips files (e.g., up to 1000 files) in the disc. An entire number of the (logically) front-end hash unit of hash units belonging to each clip file is written. This is the same as the scheme described above with reference to FIG. 5.

The offset value of clip (i) is an identification value of a disc layer (recording layer). The offset values of layer 0 are all "0s". The offset values of layer 1 are set as values indicating the number of hash units contained in layer 0. With this value, it is possible to easily know the logic addresses of hash units in the table on layer 1.

During playback of the information storage medium, the information processing apparatus (playback apparatus) for executing playback of a content from the information storage medium can perform content-tampering checking by comparing hash values calculated from arbitrary hash units of the content on the information storage medium with comparison hash values shown in the content hash table.

Figure 11:
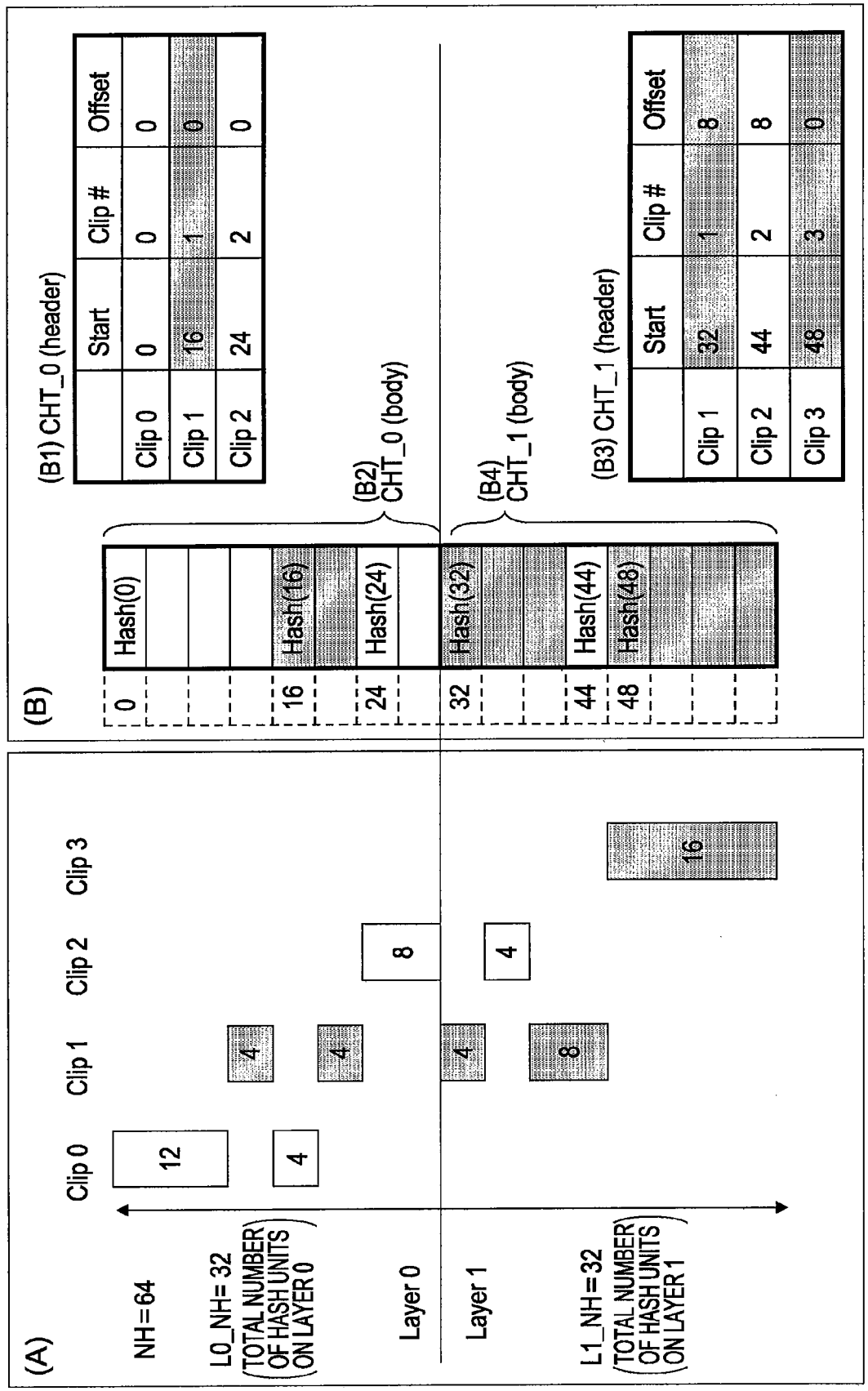
FIG. 11 is a diagram illustrating an example of a specific structure of the content hash tables.

A specific structure of the content hash table (CHT) will be described with reference to FIG. 11. FIG. 11(A) shows the data recording structure of an information storage medium (disc) having two recording layers (layers 0 and 1) and FIG. 11(B) shows the structures of content hash tables for the recorded data.

As shown in FIG. 11(A), four clips (clips 0 to 3) are recorded to the information storage medium (disc) having two recording layers (layers 0 and 1), and the total number (NH) of hash units is 64. Clip 0 has 16 hash units, all of which are recorded to the layer 0. For clip 1, eight hash units are recorded to the layer 0 and 12 hash units are recorded to the layer 1. For clip 2, eight hash units are recorded to the layer 0 and four hash units are recorded to the layer 1. For clip 3, 16 hash units are recorded to the layer 1.

The total number (L0_NH) of hash units on the layer 0 is 32, and
the total number (L1_NH) of hash units on the layer 1 is 32.

In this structure, the content hash table (CHT) is set for each layer and two content hash tables are recorded. FIG. 11(B) shows header data and body data of the content hash tables. (B1) indicates header data of the content hash table of the layer 0. The header data includes the following values for the respective clips (clips 0 to 2) contained in the layer 0:
the number of the front-end hash unit of clip (i)=Start;
a number corresponding to a file name of clip (i)=Clip #; and
the offset value of clip (i)=offset.

(B2) indicates body data of the content hash table of the layer 0. The body data includes comparison hash values of hash units (hash numbers 0 to 31) contained in the layer 0.

(B3) indicates header data of the content hash table of the layer 1. For the clips (clips 1 to 3) contained in the layer 1, the header data includes:
the number of the front-end hash unit of clip (i)=Start;
a number corresponding to a file name of clip (i)=Clip #; and
the offset value of clip (i)=offset.

(B4) indicates body data of the content hash table of the layer 1. The body data includes comparison hash values of hash units (hash numbers 32 to 63) contained in the layer 0.

During playback of the information storage medium, the information processing apparatus (playback apparatus) for executing playback of a content from the information storage medium performs content-tampering checking by comparing hash values calculated from arbitrary hash units of the content on the information storage medium with comparison hash values shown in the content hash table. The processing will be described in a subsequent paragraph.

Next, another configuration example of the content hash table (CHT) will be described. FIG. 12(A) shows an example of the content hash table (CHT) when one content hash table (CHT) is set for each clip file. Content hash tables (CHT) corresponding to the number of clips stored on the information storage medium are stored.

The content hash table (CHT) shown in FIG. 12(A) includes:

identification information indicating to which clip number the content hash table corresponds. Subsequent to the identification information, the following information for clip (n) is recorded:

the number (NH) of all hash units;

the number of CPS unit to which clip (n) belongs; and

[Hash Values] serving as hash values (comparison hash values) for respective hash units.

In the configuration in which one content hash table (CHT) is set for one clip file, a content-hash-table and clip-association-table shown in FIG. 12(B) is stored.

In the content-hash-table and clip-file association table, the following data are recorded:

the number (NC) of all clips, and the total number (NH) of hash units. Subsequent to the data, the followings are recorded for each clip (i):

the number of a front-end hash unit of clip (i); and a number corresponding to the file name of clip (i).

As shown in FIG. 12(A), in the configuration in which one content hash table (CHT) is set for one clip file, for example, when the information processing apparatus for executing content playback attempts to access a clip AV stream #xxxxx, it needs to select hash units corresponding to the clip AV stream #xxxxx to perform hash determination and comparison. The selection processing requires a clip AV stream file number #xxxxx and corresponding information in the hash table. As the corresponding information, the content-hash-table and clip-file association table shown in FIG. 12(B) is used.

The content-hash-table and clip-file association table shown in FIG. 12(B) does not have to be used. For example, a configuration that makes it possible to identify to which AV stream data file a data file in the content hash table (CHT) corresponds may be used as a configuration for setting identification data corresponding to a clip AV stream file number #xxxxx for the data file name in the content hash table (CHT). For example, the configuration may be such that the data file name in the content hash table (CHT) is set to [CHT_XXXX-.data].

[4. Details of Manufacture of Information Storage Medium and Data Storage Processing]

As described above, hash values that are set in association with respective hash units are recorded in the content hash table (CHT) and are stored on an information storage medium together with a content. Manufacture of an information storage medium having such a data recording structure and data storage processing will be described below in detail.

Figure 13:
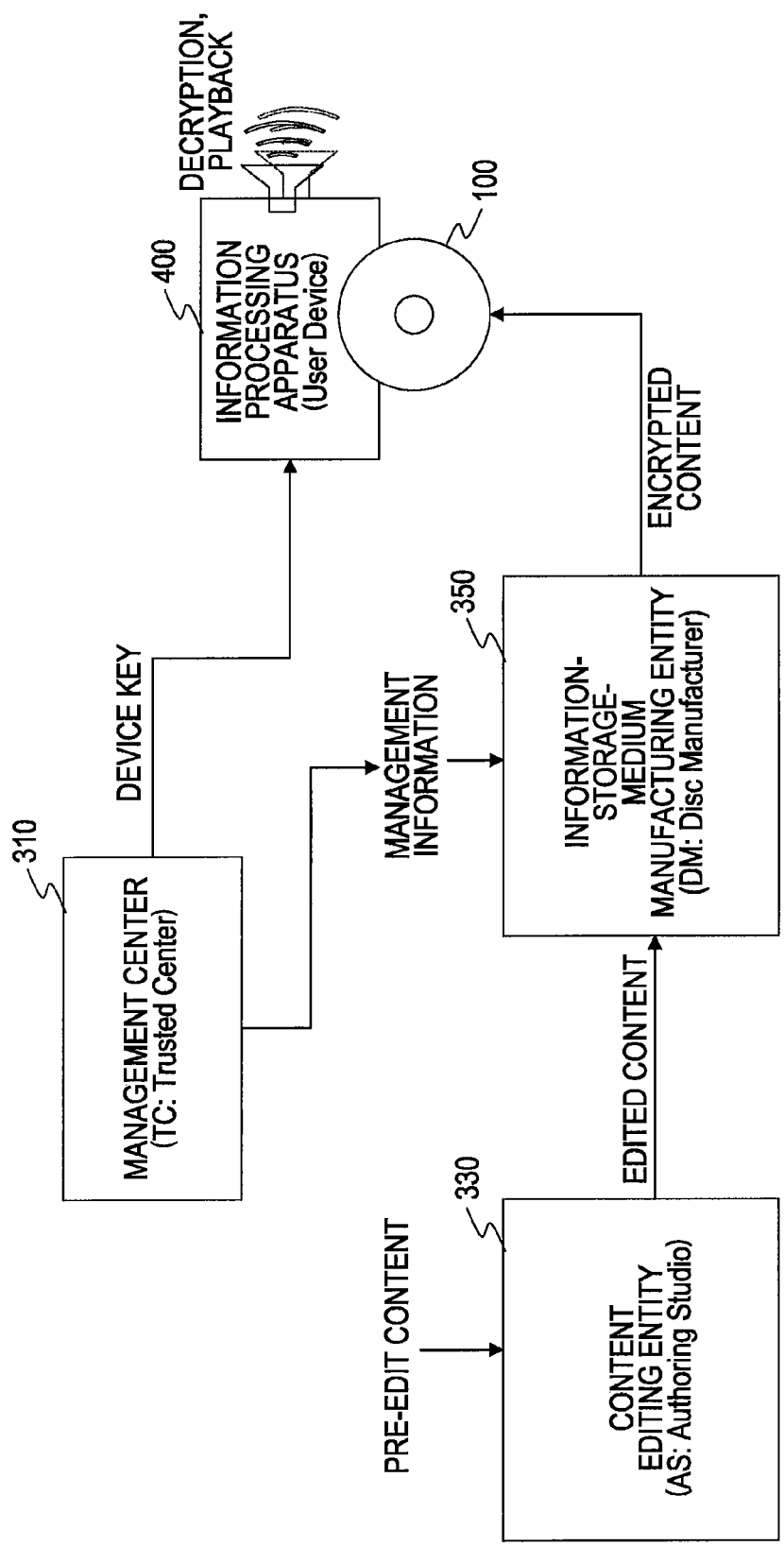
FIG. 13 is a diagram illustrating an overview of processing of a management center, a content editing entity, and an information-storage-medium manufacturing entity in the manufacturing process of the information storage medium.

As shown in FIG. 13, a content-editing entity (AS: authoring studio) (=authoring facility) 330 edits a content to be stored on the information storage medium. An information-storage-medium manufacturing entity (DM: disc manufacturer) (=encryption facility) 350 produces a large amount of copies (replicas) of, for example, a CD, DVD, or Blu-ray disc, so that information storage media 100 are manufactured and are supplied to users. The information storage medium 100 is played back by a user device (information processing apparatus) 400.

A management center (CT: trusted center) (=license entity) 310 executes management of entire processing of disc manufacture, sales, and use. The management center (TC: trusted center) 310 supplies various types of management information to the information-storage-medium manufacturing entity (DM: disc manufacturer) 350. Examples of the management information include a media key Km set for media (information storage media) and an MKB serving as an encryption key block in which the media key Km is contained as encryption data. Based on the management information received from the management center (TC: trusted center) 310, the information-storage-medium manufacturing entity (DM: disc manufacturer) 350 performs processing for editing and encrypting the content received from the content editing entity (AS: authoring studio) 330 and generating and storing key information. The management center (TC: trusted center) 310 also manages a device key to be stored in the user information processing apparatus 400 and supplies the device key.

Figure 14:
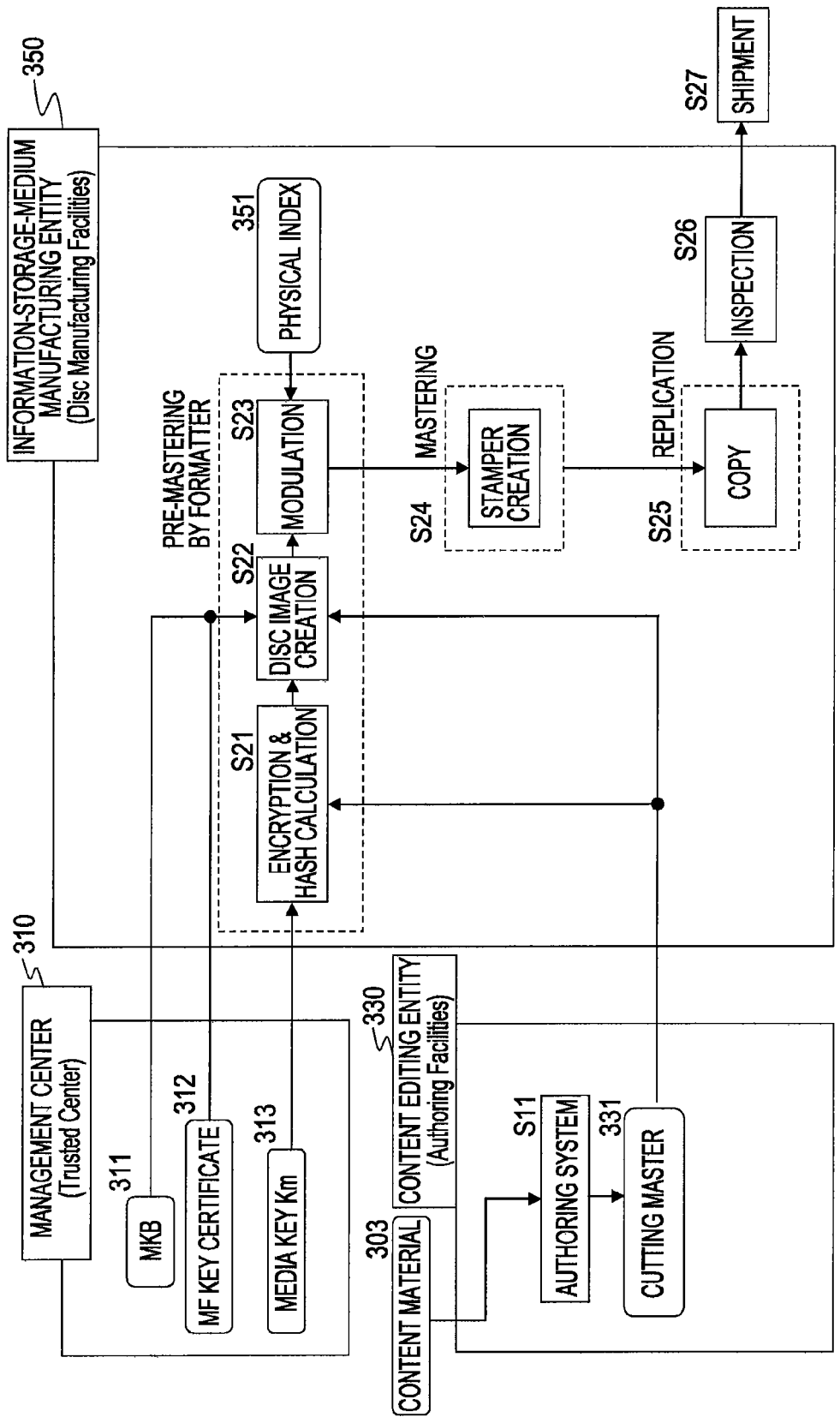
FIG. 14 is a diagram illustrating an example of processing executed by the management center, the content editing entity, and the information-storage-medium manufacturing entity.

An example of processing executed by the management center 310, the content editing entity 330, and the information-storage-medium manufacturing entity 350 will be described with reference to FIG. 14.

A pre-edit content 303 is brought into the content editing entity 330. An encoder performs processing for encoding the content 303 into MPEG data or the like and an authoring system performs edit processing (step S11) on the encoded data. Subsequently, a cutting master 331 containing the edited content is produced.

Although not shown, CCI information (copy/playback control information), which serves as copy restriction information for the content and playback restriction information, and recording seeds used for content encryption are also generated when the authoring system performs the edit processing (step S11). As described above, the recording seeds can be set for CPS units, respectively. Thus, when the edited content 331 has multiple content management units (CPS units), recording seeds Vu are also generated so as to correspond to the number of CPS units. The edited content 331 shown in the figure contains the CCI information and recording seeds Vu, and the cutting master 331 containing the edited content is sent to the information-storage-medium manufacturing entity 350.

The information-storage-medium manufacturing entity 350 obtains information (management information) required for content encryption from the management center 310.

The management center 310 generates a media key Km 313 and further generates a media key block (MKB) 311 in which the media key Km 313 is contained as encrypted data. The management center 310 supplies the media key block (MKB) 311, the media key Km 313, and a public-key certificate (MF key certificate) 312 to the information-storage-medium manufacturing entity 350. The public-key certificate 312 contains a public key of the information information-storage-medium manufacturing entity 350.

As described above, the MKB 312 contains the encrypted data, which can be decrypted only through decryption processing using a device key stored in a playback apparatus having a license for a valid content-use right. Thus, only a playback apparatus having a license for a valid content-use right can obtain the media key Km.

The information-storage-medium manufacturing entity 350 receives the cutting master 331 containing the edited content from the content editing entity 330, receives the media key block (MKB) 311, the public-key certificate (MF key certificate) 312, and the media key Km 313 from the management center 310, and manufactures information storage media.

First, in step S21, encryption processing using the media key 313 for the cutting master 331 and hash calculation are executed. The encryption processing is executed as, for example, encryption processing in the CBC mode based on the AES cryptographic algorithm described above with reference to FIG. 7. The hash calculation is executed as hash-value determination processing for each hash unit described above and is executed as processing for generating content hash tables (CHTs) in which the determined values are recorded as comparison hash values. The content hash tables (CHTs) have the structures described above with reference to FIGS. 11 and 12. As described above, when the content hash tables (CHTs) are recorded for clips, respectively, the content-hash-table and clip-file association table is generated concurrently, as needed.

When the generation of the encrypted content and the content hash tables (CHTs) is completed, in step S22, processing for generating a disc image, which contains recorded data, is executed. The disc image contains all data to be recorded to the information storage medium (disc). In addition to the encrypted content and the content hash tables, the disc image contains the media key block (MKB) 311 and the public-key certificate (MF key certificate) 312.

When the generation of the disc image is completed, in step S23, processing for modulating the disc image is executed to produce modulated data, which contains recording signals. In step S24, based on the modulated data, mastering processing is performed to create a stamper, which serves as a disc master. Further, in step S25, replication (copying) is executed to produce a large number of discs. After an inspection process in step S26, the discs are shipped in step S27.

The encryption of the content and the generation of the content hash tables (CHTs) can be executed for respective layers up to the mastering process in step S24. This is because the content hash tables (CHTs) have independent structures for the respective layers, as described above with reference to FIGS. 10 and 11. During the replication (copying), performing bit transfer using a stamper for each layer produces discs each having multiple layers.

Next, a description is given of details of processing for generating the encrypted content and the content hash tables (CHTs), the processing being executed by the information-storage-medium manufacturing entity 350 in step S21. First, a detailed sequence of disc-image generation processing involving content encryption processing and content-hash-table (CHT) generation will be described with reference to the flow shown in FIG. 15.

First, in step S101, an auxiliary information file (MSTBL.DAT) used for generating the disc image is read. The auxiliary file is contained in the cutting master 331, which contains the edited content, received from the content editing entity 330.

FIG. 16 shows a specific example of the disc-image-generation auxiliary information file (MSTBL.DAT), and FIG. 17 shows syntax to illustrate data contained in the auxiliary information file (MSTBL.DAT) for disc-image generation.

The disc-image-generation auxiliary information file (MSTBL.DAT) contains information required for generating the disc image from the cutting master 331. Specifically, the auxiliary information file (MSTBL.DAT) contains the following information.

UD_START_Location: Physical Sector Number of Starting point of User Data (Data Zone) on each Layer UD_END_Location: Physical Sector Number of End Point of User Data (Data Zone) on each Layer CHT_Location: Physical Sector Number of Starting Point of CHT CHT_Offset: N of Bytes from Starting Point of CHT to Point immediately before Hash Value (Data Filled with Mastering Facility)

Current_Cert_Location: Physical Sector Number of Starting Point of Content Certificate Content_Cert_Offset: Number of Bytes from Starting Point of Content Certificate to Point immediately before Content ID (Data Filled with Mastering Facility).

UK_Inf_Location: Physical Sector Number of Starting Point of Unit_Key.inf (see P.2). When Unit_Key.inf is not Recorded on the Layer, $00000000_{16}$ is Written.

UK_Inf_Offset: Number of Bytes from Starting Point of Unit_Key.inf to Point immediately before Encrypted Unit Key for CPS Unit #1. When Unit_Key.inf is not Recorded on the Layer, $00000000_{16}$ is Written.

Num_of_UK: Number of Unit Keys of Entire Disc (=Number of CPS Units). MFK_Cert_Location: Physical Sector Number of Starting Point of MF Key Certificate. Size is fixed. When MFK_Cert is not Recorded on the Layer, $00000000_{16}$ is Written.

MKB_Location: Physical Sector Number of Starting Point of MKB. When MKB_Cert is not Recorded on the Layer, $00000000_{16}$ is Written.

N: the number of Logical Sectors on the layer i

Encryption_Flag: Flag indicating Whether or not to Perform Encryption

Data_Type: Flag indicating Sector Type

CPS_Unit_No: CPS Unit Number

Clip_AV_File_No: Clip File Number Information Used for Creating CHT

Last_Sector_of_Clip: Flag Indicating Last Sector of each Clip (on any Layer)

Last_Sector_of_Layer: Flag indicating Last Sector of each Clip in each Layer

The disc-image-generation auxiliary information file (MSTBL.DAT) contains information, such as information indicating whether or not encryption is required for each sector and information indicating which unit key (CPS Unit Key) is to be used to execute encryption. The information-storage-medium manufacturing entity 350 determines processing for each recording sector, in accordance with the auxiliary information file (MSTBL.DAT).

Referring back to FIG. 15, the description for the flow of the processing executed by the information-storage-medium manufacturing entity 350 will be continued. After the auxiliary information file (MSTBL.DAT) is read in step S101, a variant j, which is the number of a sector to be processed, is set so that j=0 is satisfied for initialization in step S102.

In step S103, a determination is made as to whether or not j<"the number of all sectors" is satisfied. When the determination of j<"the number of all sectors" indicates Yes, the process proceeds to step S104, in which user sector data (j) is read from the cutting master. In step SI 05, with reference to an encryption flag of the user sector data (j) and based on the value of the encryption flag, a determination is made as to whether or not encryption processing is to be required. When the encryption flag (Encryption Flag) indicates [00] as specified in the auxiliary file shown in FIG. 16, the sector does not require encryption. When the encryption flag indicates [1], the sector requires encryption.

When the encryption flag does not indicate 0, it is determined that the sector requires encryption processing and the process proceeds to step S106. When the encryption flag indicates 0, it is determined that the sector does not require encryption processing and the process proceeds to step S115. In step S106, a CPS unit number (j) corresponding to the sector to be processed is read. Next, in step S107, a determination is made as to whether or not a data type for the sector to be processed is 1.

When the data type (Data Type) indicates [01] as specified in the auxiliary file shown in FIG. 16, it indicates that the sector is the first sector in an aligned unit (AU). In this case, the process proceeds to step S108, in which an initial value (IV) for the AES-CBC-mode encryption processing described above with reference to FIG. 7 is obtained. As the initial value, for example, a value supplied from the management center is used.

When it is determined in the determination in step S107 that the data type (Data Type) is not 1, it indicates that the sector is not the first sector in an aligned unit (AU). In this case, the process proceeds to step S109, in which a ciphertext unit of the previous sector (j−1) on which the AES-CBC-mode processing has already been executed is obtained. Next, in step S110, AES cryptographic processing using a unit key is executed. The processing described above corresponds to the AES-CBC-mode encryption processing process described above with reference to FIG. 7.

When one ciphertext unit is generated, the number of a clip file on which the processing has been executed is read in step S111. In step S112, a cipher unit (16 B) is stored in a buffer corresponding to the clip. In step S113, a determination is made as to whether or not the data stored in the buffer reaches 192 bytes. When the data reaches it, a hash value is determined in step S114. That is, a hash value is determined each time the data reaches 192 KB, which is a unit of a hash unit, and is stored in the memory as a comparison hash value to be contained in the content hash tables.

The processing described above is repeatedly executed for each sector, through incrementing of the sector No. in step S115. When processing of all sectors is executed and the determination in step S103 indicates No for the determination of j<"the number of all sectors", the process proceeds to step S121.

In step S121, content hash tables (CHTs) in which the comparison hash values determined for the respective hash units, each having 192, are contained are generated. The content hash tables (CHTs) have the structures described above with reference to FIGS. 10 and 12.

Figure 18:
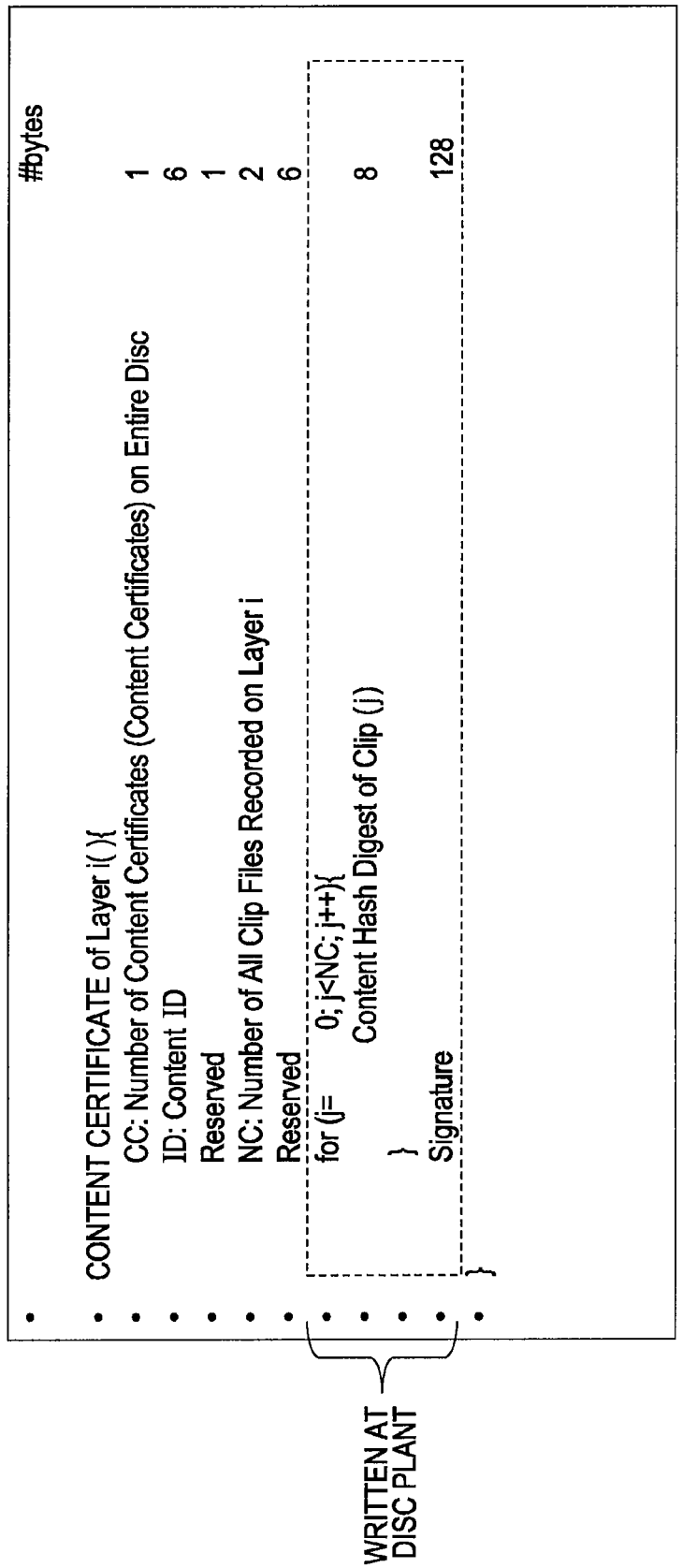
FIG. 18 illustrates the data structure of a content certificate.

In addition, in step S122, a content certificate is created. The structure of the content certificate will be described with reference to FIG. 18. The content certificate certifies that the content stored on the information storage medium is a legitimate content. For example, one certificate is provided for each layer and is stored on the information storage medium.

The content certificate contains the following information:
(a) CC: Number of Content Certificates on Entire Information Storage Medium;
(b) ID: Content ID;
(c) NC: Number of all Clip Files Recorded on each Layer;
(d) Content Hash Digest of each Clip; and
(e) Electronic Signature (Signature).

Of the information described above, (b) the content ID is identification data corresponding to the content and has a value given by the management center 310. (d) and (e) are data generated by the information-storage-medium manufacturing entity 350.

For example, a determined in the determination processing described below is recorded as the content hash digest.

Example of Processing for Determining Content Hash Digest of Clip (j)

With respect to hash values of clip (j) which are recorded in the content hash table of the layer i, for example, with respect to Hash Value(k)∥Hash Value(k+1)∥ . . . ∥Hash Value(l−1)∥Hash Value(l), hash calculation is performed by, for example, SHA-1 and the determined value is set as the content hash digest of clip (j). In the above-noted expression, ∥ indicates data coupling.

The electronic signature (Signature) is an electronic signature for data (CC-Clip (NC-1)) recorded in the content certificate. As a signature key, a secret key (SK_MF) of the information-storage-medium manufacturing entity 350 is used. For example, an RSA is used for a function of the electronic signature. The information processing apparatus for playing back the information storage medium obtains a public key from a public-key certificate of the information-storage-medium manufacturing entity 350, the public-key certificate being stored on the information storage medium, and checks whether or not data is tampered, that is, verifies the legitimacy of the content certificate.

When the content editing entity (authoring facility) calculates content hashes, the content editing entity (authoring facility) writes a content hash digest of a clip and the electronic signature.

Figure 19:
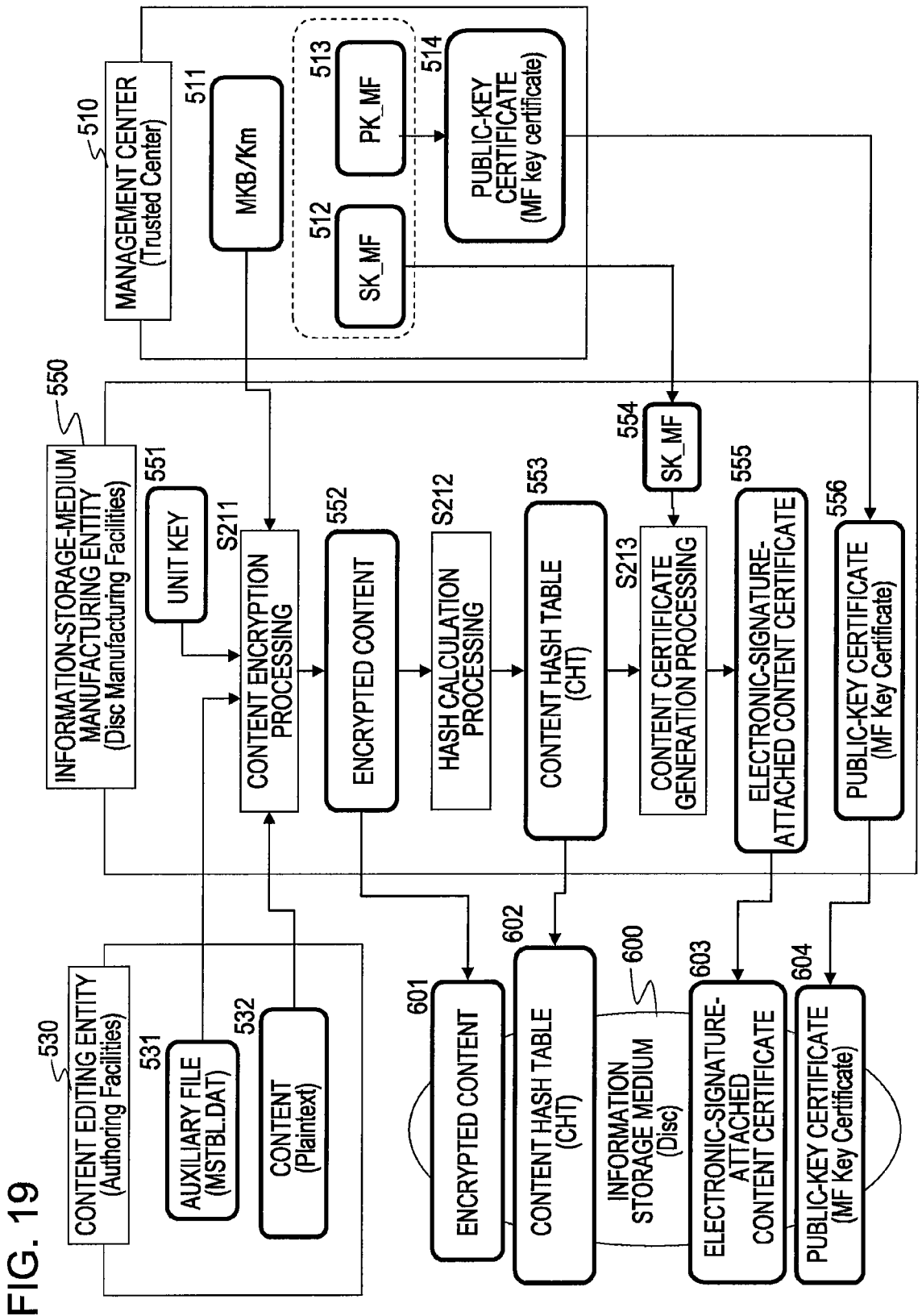
FIG. 19 is a diagram illustrating an example of processing executed by the management center, the content editing entity, and the information-storage-medium manufacturing entity during the manufacture of a content-storing information storage medium.

An overview of data flow and data processing for manufacturing an information storage medium in which an encrypted content and other data are stored will be described with reference to FIG. 19. FIG. 19 shows a management center (TC: trusted center) (=license entity) 510, a content editing entity (AS: authoring studio) (=authoring facility) 530, an information-storage-medium manufacturing entity (DM: disc manufacturer) (=encrypting facility) 550, and an information storage medium (Disc) 600 that is ultimately manufactured.

The information-storage-medium manufacturing entity 550 obtains a media key block (MKB) containing a media key (Km) from the management center 510, obtains the media key, and obtains a plaintext content 532 and an auxiliary file (MSTB.DAT) 531 from the content editing entity 530. In the auxiliary file 531, detailed information of encryption processing is specified. Further, using a unit key 551, the information-storage-medium manufacturing entity 550 executes content encryption processing (step S211) to generate an encrypted content 552. The content encryption processing is executed as the AES-CBC-mode encryption processing (see FIG. 7) in which processing is performed for each sector, as described above with reference to FIG. 15. The generated encrypted content 552 serves as an encrypted content 601 stored on the information storage medium 600.

In addition, in step S212, the information-storage-medium manufacturing entity 550 determines hash values for predetermined data units (hash units) of the generated encrypted content 552. This processing corresponds to the processing in steps S112 to S114 described above with reference to FIG. 15. In the processing, a hash value is determined for each 192 KB data unit, which is the data length of each hash unit. The hash values are recorded as comparison hash values in content hash tables 553, which serve as content hash tables 602 stored on the information storage medium 600.

Additionally, in step S213, the information-storage-medium manufacturing entity 550 executes content-certificate generation processing. The content certificate is data having the data structure described above with reference to FIG. 18 and is used for certifying the legitimacy of the content. The content certificate stores the content hash digest (see FIG. 18)

based on hash values contained in the content hash tables 602. Further, an electronic signature corresponding to stored data is attached.

The management center 510 holds a secret key (SK_MF) 512 of the information-storage-medium manufacturing entity 550 and a public key (PK_MF) 513 and supplies the secret key 512 and a public-key certificate 514, which contains the public key (PK_MF), 513 to the information-storage-medium manufacturing entity 550.

Using a secret key (SK_MF) 554 received from the management center 510, the information-storage-medium manufacturing entity 550 executes attaching of an electronic signature to the content certificate to generate an electronic-signature-attached content certificate 555. This serves as a content certificate 603 stored on the information storage medium 600.

In addition, the information-storage-medium manufacturing entity 550 records a public-key certificate 556, received from the management center 510, to the information storage medium. This serves as a public-key certificate 604 stored on the information storage medium 600

Figure 15:
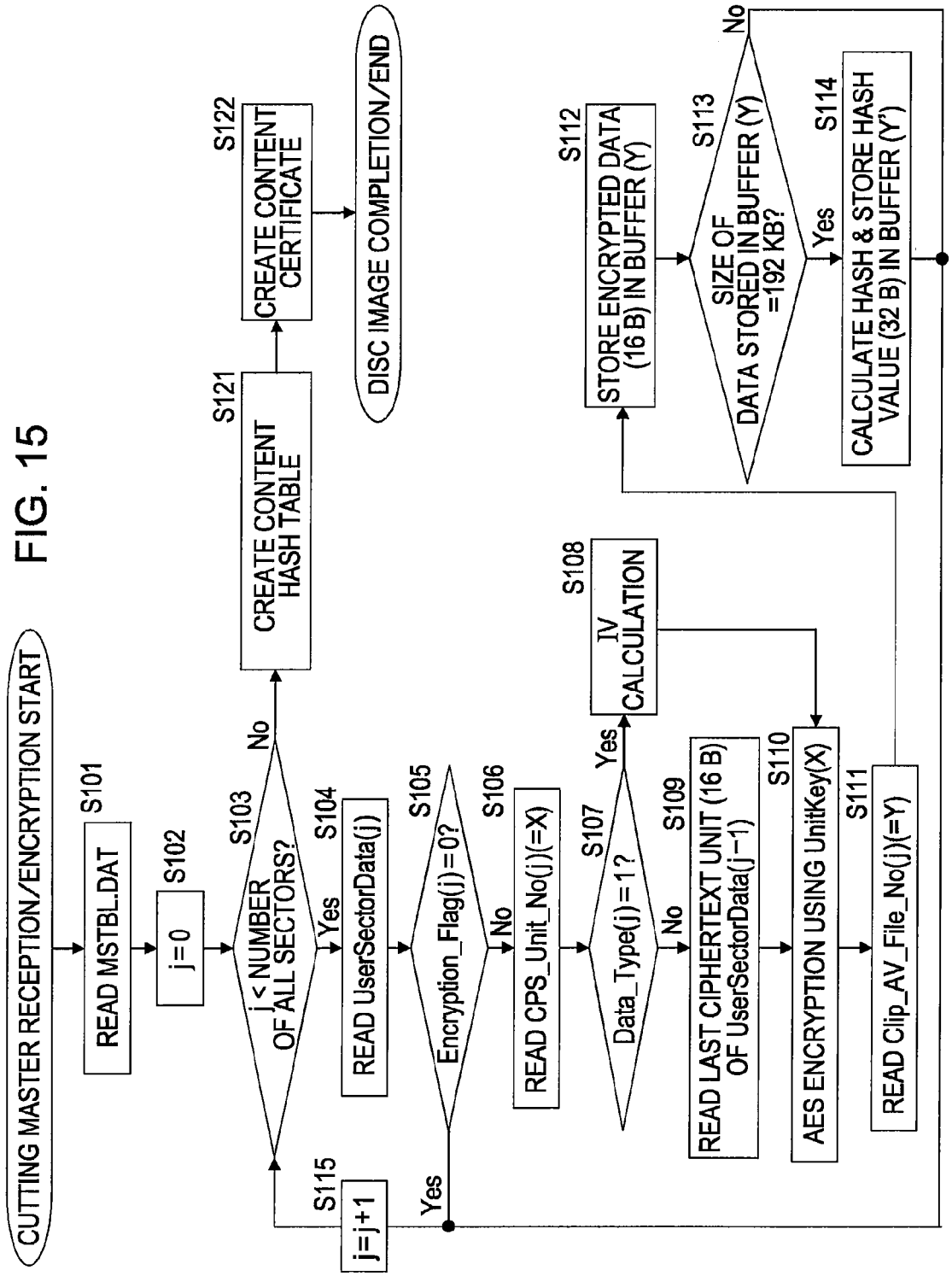
FIG. 15 is a flow chart illustrating a generation processing procedure of a disc image, which is generated as data to be stored on the information storage medium.

The processing example shown in FIG. 19 is a processing example along the processing flow shown in FIG. 15, but the assignment of roles of the individual entities is not limited to the processing example shown in FIG. 15 or 19. Other processing examples will be described with reference to FIGS. 20 to 21.

Figure 20:
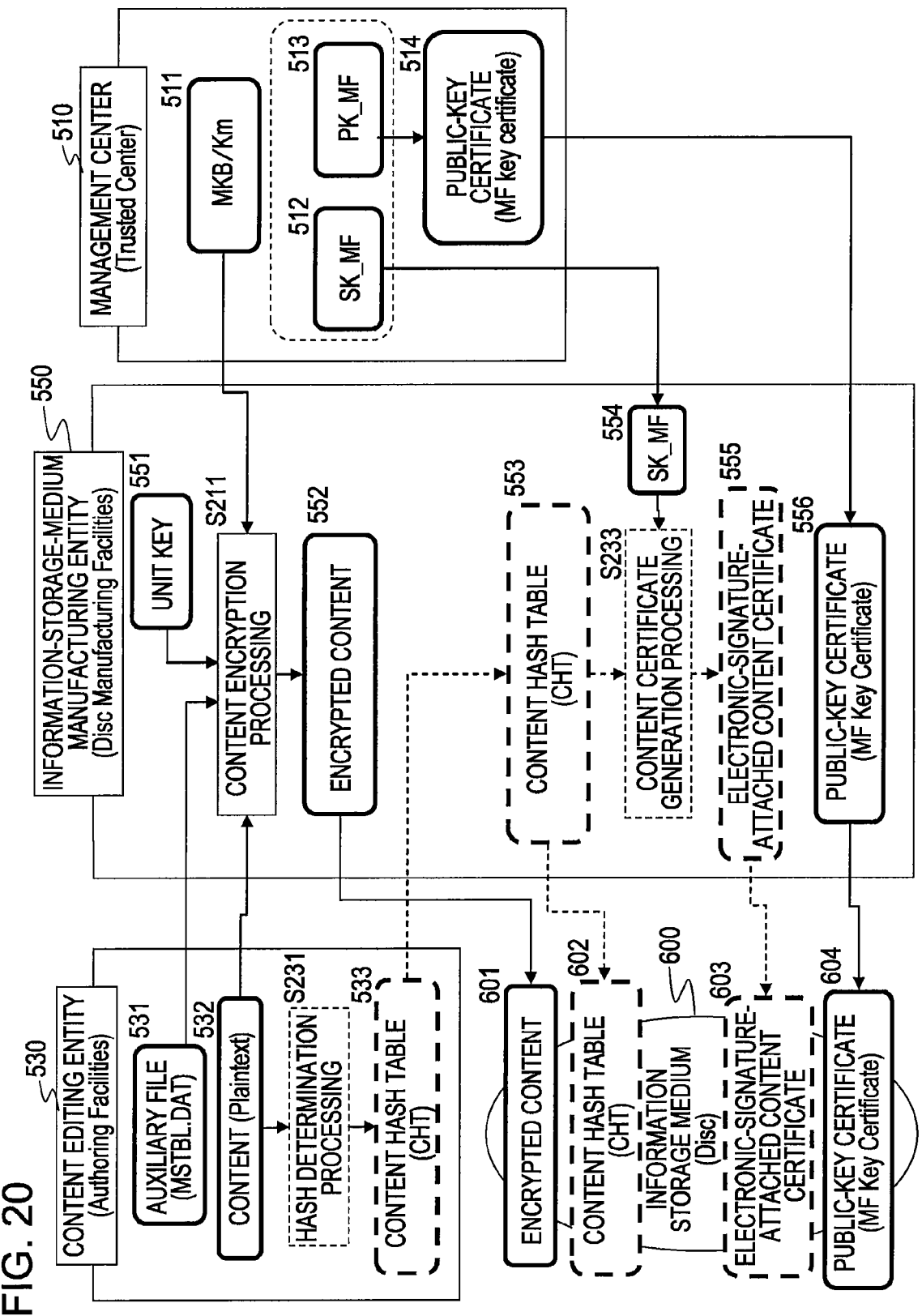
FIG. 20 is a diagram illustrating an example of processing executed by the management center, the content editing entity, and the information-storage-medium manufacturing entity during the manufacture of the content-storing information storage medium.

FIG. 20 is a processing example in which the content editing entity (AS: authoring studio) (=authoring facility) 530 executes hash-value determination processing and content-hash-table (CHT) generation processing. The structures of dotted line portions shown in FIG. 20 are different from the structures in the processing example shown in FIG. 19.

In step S231, based on the plaintext content 532, the content editing entity 530 extracts hash units, determines hash values for the respective hash units, and generates content hash tables (CHTs) 533 in which the determined hash values are recorded. In this case, the hash values are determined for the respective hash units, each of which is set for a predetermined data length of the plaintext data.

The content hash tables (CHTs) 533 are supplied to the information-storage-medium manufacturing entity 550. Based on the hash values contained in the content hash tables (CHTs) 553, the information-storage-medium manufacturing entity 550 determines a content hash digest (see FIG. 18), stores the determined content hash digest in the content certificate, further generates an electronic signature corresponding to the stored data, and generates an electronic-signature-attached content certificate 555. This serves as a content certificate 603 stored on the information storage medium 600.

In this processing example, the content-editing entity 530 executes content-hash determination based on plaintext content and content-hash-table generation. The information-storage-medium manufacturing entity 550 executes content-certificate generation and electronic-signature addition processing.

Next, a processing example in which the information-storage-medium manufacturing entity 550 executes content-hash determination based on plaintext content and content-hash-table generation will be described with reference to FIG. 21. The structures of dotted line portions shown in FIG. 21 are different from the structures in the processing example shown in FIG. 19.

Figure 21:
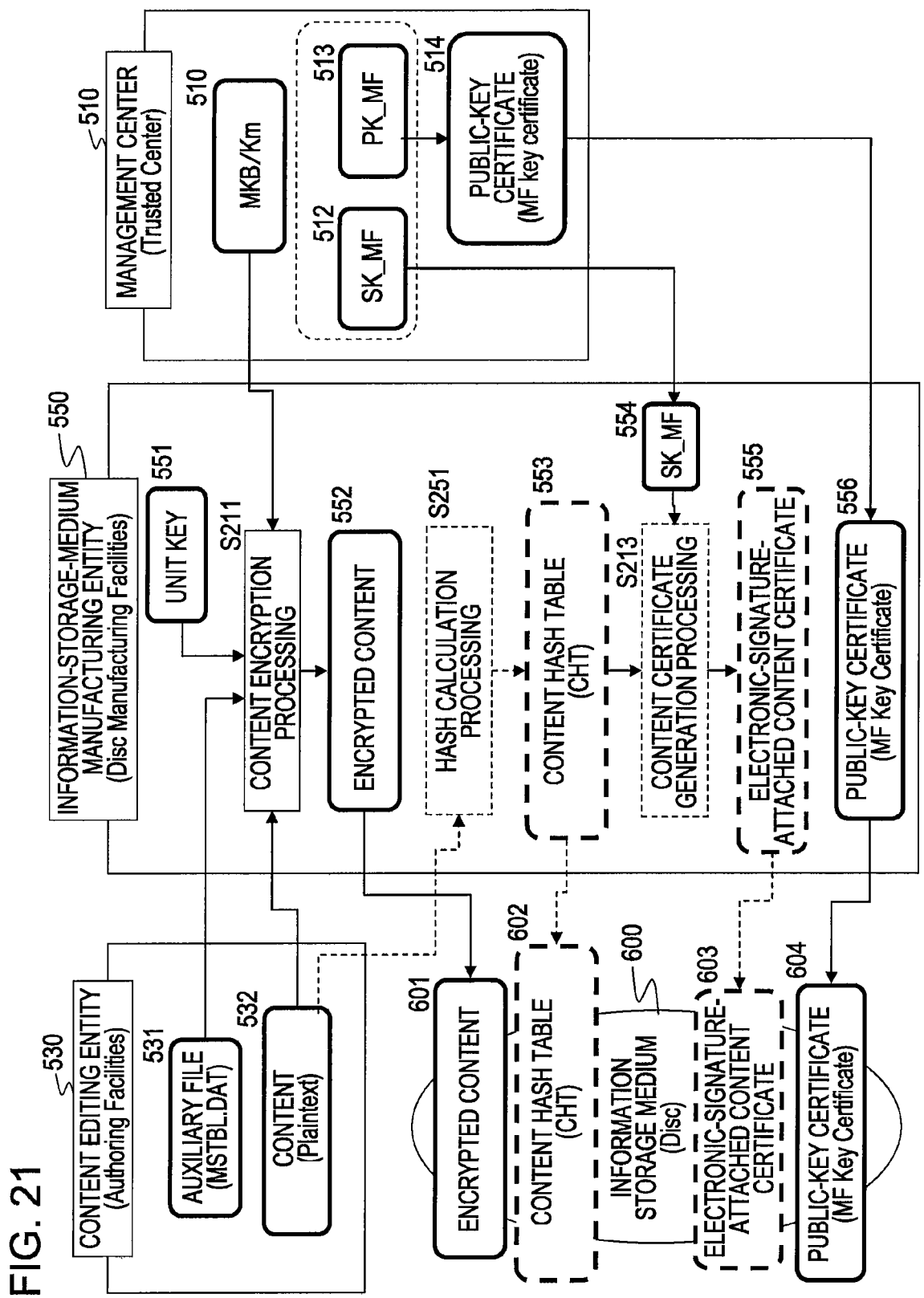
FIG. 21 is a diagram illustrating an example of processing executed by the management center, the content editing entity, and the information-storage-medium manufacturing entity during the manufacture of the content-storing information storage medium.

In step S551 shown in FIG. 21, based on the plaintext content received from the content editing entity 530, the information-storage-medium manufacturing entity 550 extracts hash units, determines hash values for the respective hash units, and generates a content hash table (CHT) 553 in which the determined hash values are recorded. In this case, the hash values are determined for the respective hash units, each of which is set for a predetermined data length of the plaintext data.

Based on the hash values contained in the content hash tables (CHTs) 553, the information-storage-medium manufacturing entity 550 determines the content hash digest (see FIG. 18), stores the determined content hash digest in the content certificate, further generates an electronic signature corresponding to the stored data, and generates an electronic-signature-attached content certificate 555. This serves as a content certificate 603 stored on the information storage medium 600.

In this processing example, the information-storage-medium manufacturing entity 550 executes content-hash determination based on plaintext content and content-hash-table generation.

In addition, as another processing example, for example, there is processing in which the content editing entity executes all of content-hash determination based on plaintext data, content-hash-table generation, content-certificate generation, and signature processing. The arrangement can also be such that not only the information-storage-medium manufacturing entity 550 but also either the content editing entity 530 or the information-storage-medium manufacturing entity 550 executes content-hash determination, content-hash-table generation, content-certificate generation, and signature processing.

[5. Verification Processing using Content Hash in Content Playback Processing]

Next, a description is given of verification processing using content hashes in content playback processing.

Content verification processing executed by the information processing apparatus (playback apparatus) for executing playback of a content from an information storage medium, the content verification processing being based on hash values, will be described with reference to FIGS. 22 to 24.

The information processing apparatus for executing processing for playing back a content from the information storage medium has content verifying means for verifying the legitimacy of the content and content playback means for executing content playback processing provided that the legitimacy of the content is verified based on the verification performed by the content verifying means. The content verifying means selects n hash units (where n is an integer of 1 or greater) set as segmented data of the content recorded on the information storage medium, executes processing for comparing hash values determined based on the selected hash units with comparison hash values stored on the information storage medium, and executes content verification processing in which the legitimacy of the content is confirmed provided that the hash values of all the selected n hash units match.

Figure 22:
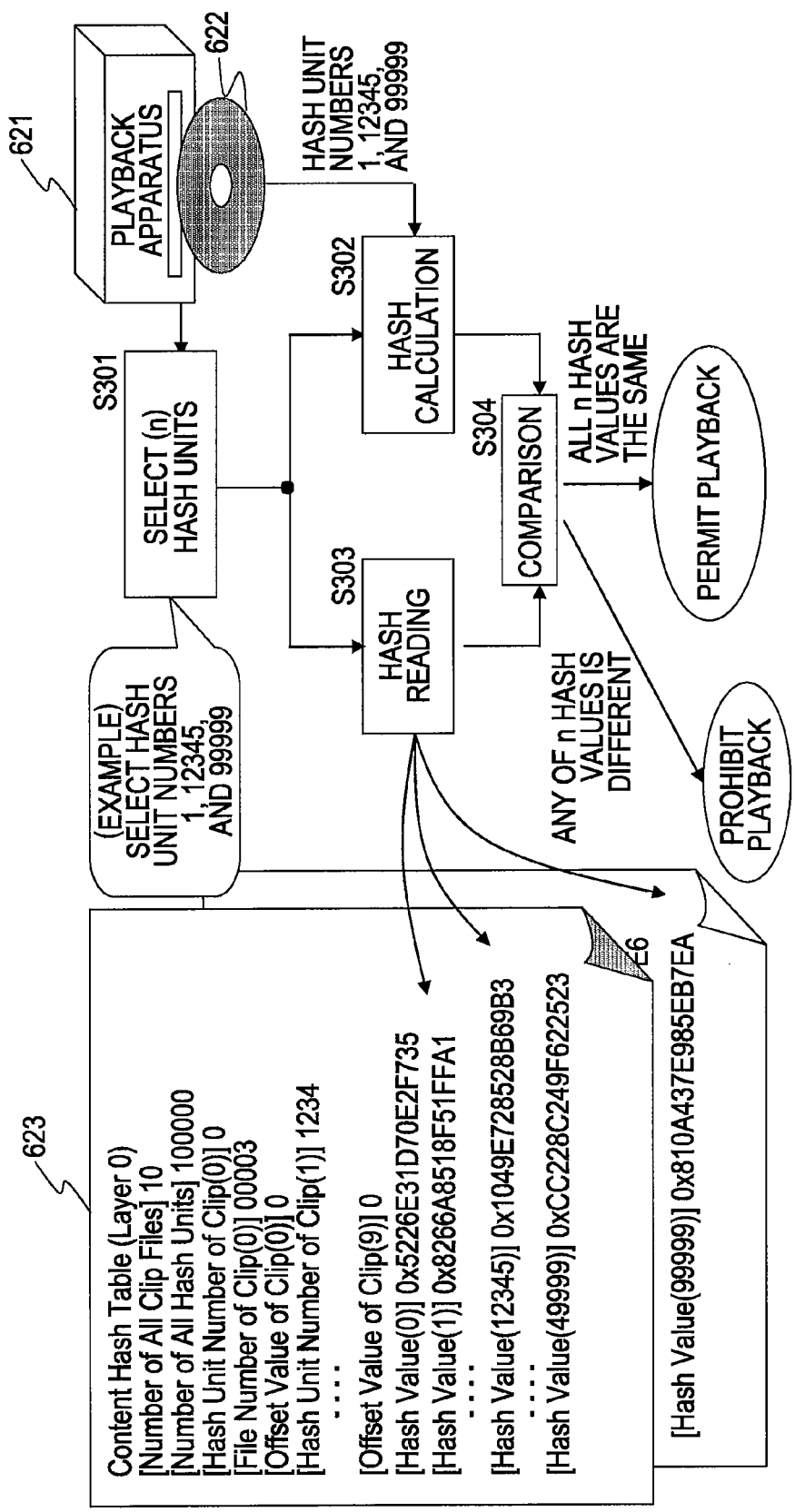
FIG. 22 is a diagram illustrating the sequence of content verification processing based on hash values, the verification processing being performed by an information processing apparatus for executing content playback.

FIG. 22 shows an overview of processing executed by the content verifying means of the information processing apparatus (playback apparatus). An information storage medium 622 in which contents are recorded is loaded into an information processing apparatus (playback apparatus) 621, and prior to playback of a content, the information processing apparatus 621 selects hash units corresponding to the content to be played back and executes comparison of hash values set for the hash units.

First, in step S301, hash units on which comparison processing is to be executed are selected. As is clear from the above description, the contents stored on the information storage medium are divided into hash units, each having a predetermined data length (e.g., 192 KB). From the large number of hash units, the information processing apparatus 621 selects hash units on which comparison processing is to be performed. Details of the unit selection processing will be described in detail in a subsequent paragraph with reference to FIG. 24. As the hash units selected as targets for the verification processing, multiple (n) hash units, for example, three hash units, are randomly selected.

It is assumed that the selected hash units are:
a hash unit #1;
a hash unit #12345; and
a hash unit #99999.

In step S302, hash-unit-associated data corresponding to the selected hash units are read from the information storage medium 622 and the hash values of the selected hash values are determined. It is assumed that the determined hash values are:
the hash value of the hash unit #1=aaa;
the hash value of the hash unit #12345=bbb; and
the hash value of the hash unit #99999=ccc.

On the other hand, in step S303, comparison hash values of the content hash units selected in step S301 as targets for the comparison processing are read from content hash tables 623 stored on the information storage medium 622. It is assumed that the read comparison hash values are:
the hash value of the hash unit #1=AAA;
the hash value of the hash unit #12345=BBB; and
the hash value of the hash unit #99999=CCC.

In step S304, the hash values determined in step S302 based on the hash units of the content are compared with the comparison hash values read from the content hash tables (CHTs). When all the determined hash values of the hash units and the corresponding hash unit values match each other, that is, when
aaa=AAA,
bbb=BBB, and
ccc=CCC
are satisfied, it is determined that the content is not tampered. Thus, playback of the content is permitted and the process proceeds to content playback processing.

On the other hand, when any mismatch of the determined hash values of the hash units and the hash unit values is detected, that is, any of
aaa≠AAA,
bbb≠BBB, and
ccc≠CCC
is detected, it is determined that the content is tampered. Thus, playback of the content is prohibited and the proceeding to content playback processing is suspended.

Next, content-hash verification processing of the information processing apparatus for executing content playback will be described in detail with reference to the flows shown in FIGS. 23 and 24.

Figure 23:
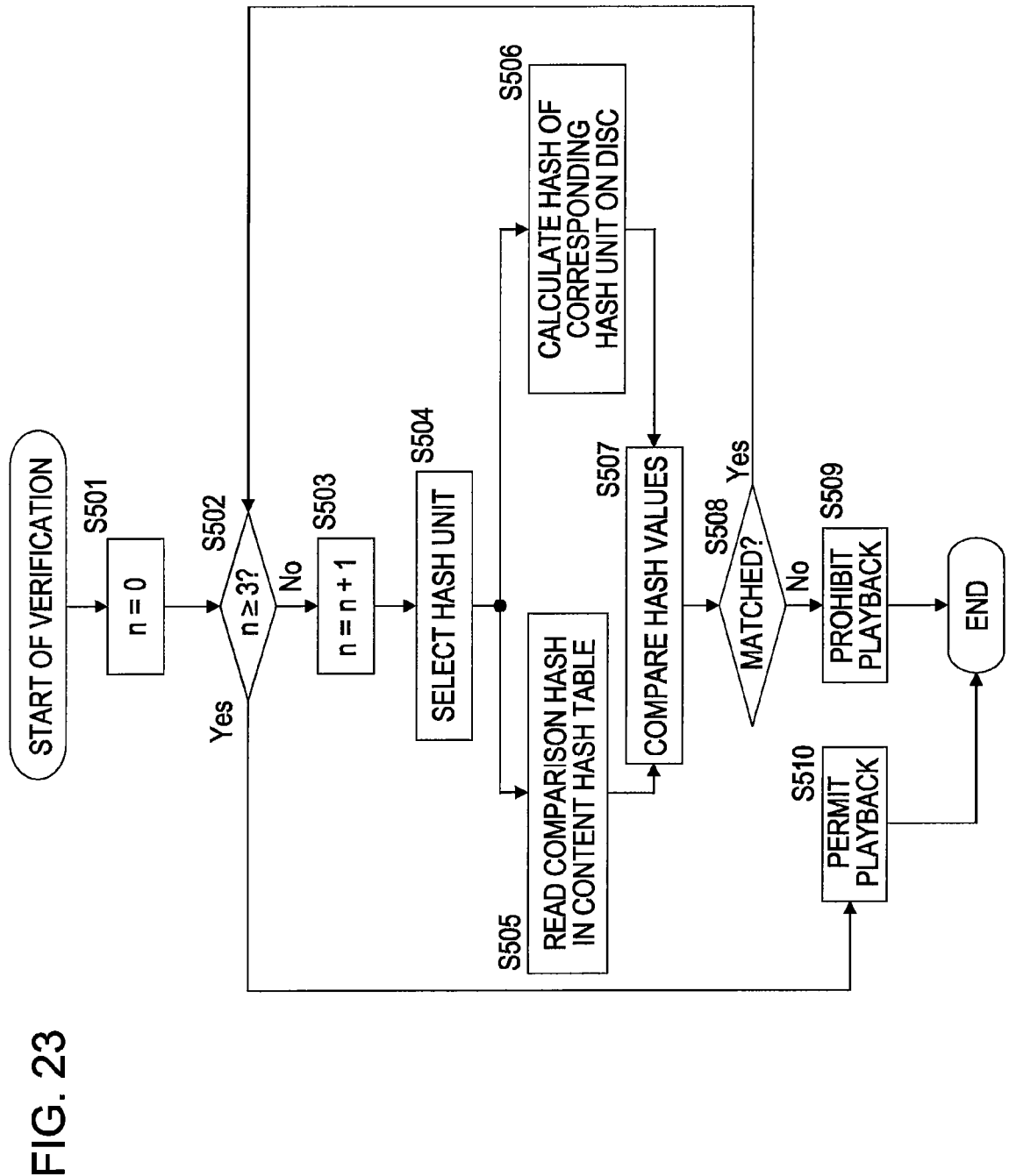
FIG. 23 is a flow chart illustrating the sequence of content verification processing based on hash values, the verification processing being performed by the information processing apparatus for executing content playback.
Figure 24:
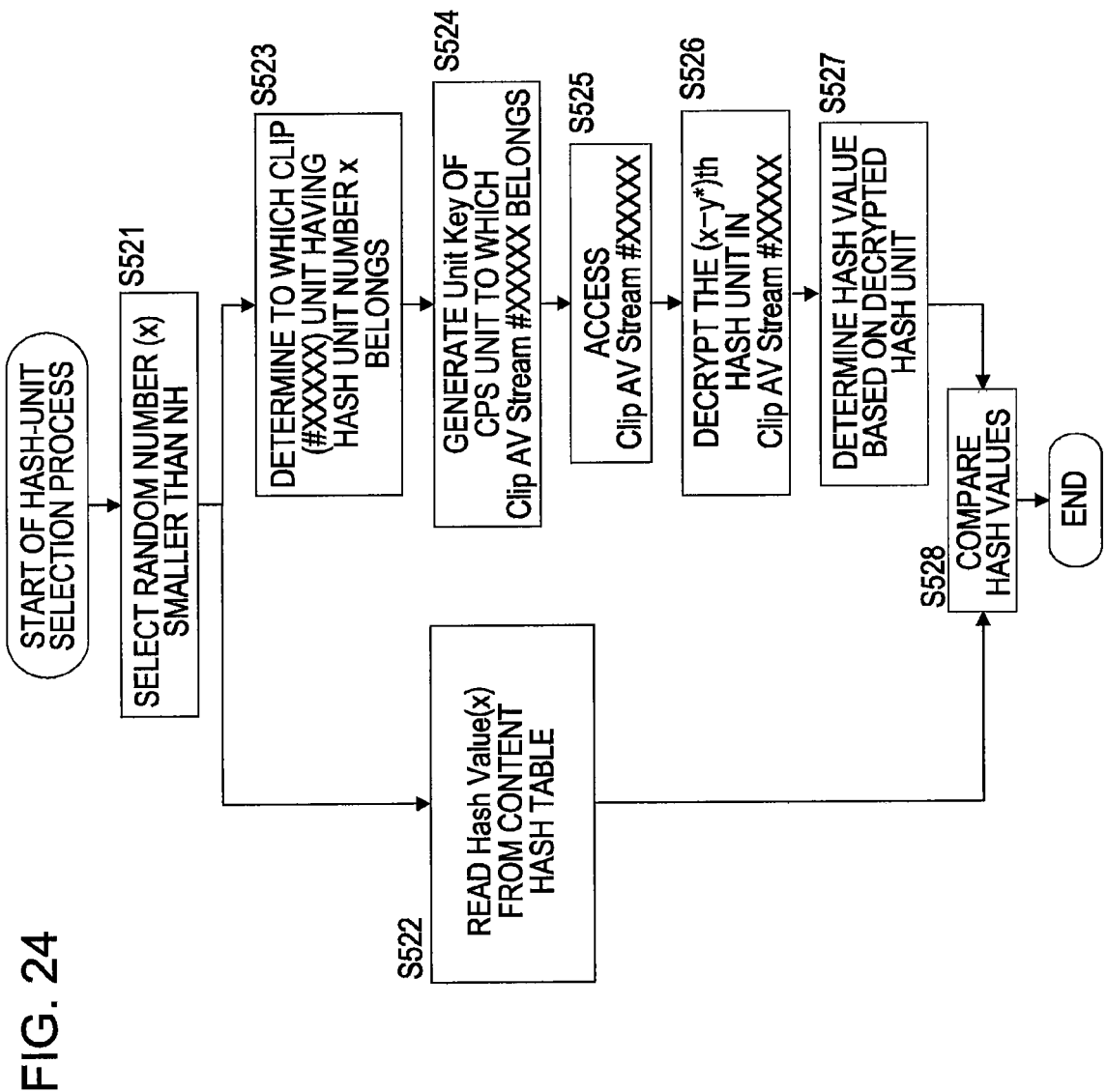
FIG. 24 is a chart illustrating the sequence of content verification processing using hash values based on plaintext data, the content verification processing being performed by the information processing apparatus for executing content playback.

The processing flow shown in FIG. 23 is a processing example in which the number n of hash units on which comparison processing is to be executed is set so that n=3 is satisfied.

In step 501, as initial setting, the information processing apparatus for executing hash-value comparison sets an initial value n=0 for the number of hash units on which comparison processing is to be performed. In step S502, a determination is made as to whether n≥3 is satisfied. When n≥3 is not satisfied, this means that the specified number (n=3) for comparison is not reached, so that comparison processing in step S503 and the subsequent processing are executed.

After n=n+1 is set in step S503, hash units are selected based on hash unit numbers in step S504. The selection of the hash units is randomly executed.

Specifically, [the number (NH) of all hash units] recorded in the content hash tables (CHTs) is read and a random number (x), where x<NH, is selected. The selected numeric value (x) is used as a hash unit number #x for executing the comparison processing.

In step S505, a comparison hash value for the hash unit number #x is obtained from the content hash tables stored on the information storage medium. In addition, in step S506, a hash unit with the hash unit number #x is extracted from the hash units of the content stored on the information storage medium, and a hash value is determined based on the extracted hash unit. In step S507, processing for comparing the determined hash value with the comparison hash value is executed.

In step S508, a determination is made as to whether or not the determined hash value matches the comparison hash value. When they match each other, the process returns to step S502, in which a determination is made as to whether or not n≥3 is satisfied. When the specified number (n=3) for comparison is not reached, n is updated in step S503. Thereafter, in step S504, selection of a new hash unit is executed. Subsequently, in steps S505 to S507, with respect to a different hash unit, similar processing for comparing the determined hash value with the comparison hash value is executed. The above-described processing is repeatedly executed a predetermined number of times. When it is then determined that matches of all the specified number (n=3) of hash values are confirmed, a determination for n≥3 indicates Yes in step S502. In step S510, playback is permitted and the process proceeds to playback processing.

During the specified number n of hash-value verification processing operations, when no match is confirmed in step S508 in which the determination is made as to whether the determined hash value and the comparison hash value match each other, the process proceeds to step S509, in which playback is prohibited and the process does not proceed to content playback processing.

When hash values for comparison are set for an encrypted content, hash values can be directly determined from hash units corresponding to the encrypted content read from the information storage medium, as described above. However, when hash values are determined for plaintext described above and are recorded in the content hash tables (CHTs) as comparison hash values, hash values to be determined also need to be determined based on the plaintext.

A processing procedure for verification using hash values based on plaintext will be described with reference to FIG. 24. Processing shown in FIG. 24 corresponds to the processing in steps S504 to S507 in the processing flow shown in FIG. 23. After the processing in steps S501 to S503 is performed, in step S521 shown in FIG. 24, [the number (NH) of all hash units] recorded in the content hash tables (CHTs) is read and a random number of x<NH is selected.

In step S522, a comparison hash value (hash value (x)) for the hash unit number #x is obtained from the content hash tables stored on the information storage medium. In step S523, a calculation is performed to determine to which clip the unit having the hash unit number #x belongs.

As described above, what are recorded in the content hash table (CHT) are:
the number (NC) of all clips, and
the number (NH) of all hash units,
Subsequent to the data, the following data are recorded for each clip (i):
the number of the front-end hash unit of clip (i),
a number corresponding to the file name of clip (i),
an offset value of clip (i), and

[Hash Values] serving as hash values (comparison hash values) for respective hash units for each clip.

Based on the data recorded in the content hash tables, a clip to which the unit belongs is determined from a hash unit number. Next, a unit key of the content management unit (CPS unit) to which a clip AV stream belongs is generated in step S524. As described above with reference to FIGS. 2 and 3, each clip belongs to a content management unit (CPS unit), and each content management unit (CPS unit) is associated with a unit key and is encrypted using the unit key. In step S524, the unit key is generated. The generation process of the unit key will be described later.

Next, in step S525, the clip AV stream is accessed. In step S526, a hash unit #x contained in the clip AV stream is obtained and is subjected to decryption processing. Further, in step S527, based on the decrypted data of the hash unit #x, a hash value is determined.

In step S528, a determination is made as to whether or not the determined hash value and the comparison hash value match each other. When they match, similar processing is further performed on another hash unit and the comparison processing is repeatedly executed until the specified number for comparison (e.g., n=3) is reached. When matches of all hash values for the specified number (n) are confirmed, playback is permitted and the processing proceeds to playback processing. When any hash value whose matching is not confirmed appears during a specified number n of hash-value verification processing operations, playback is prohibited at this point and the process does not proceed to content playback processing.

[6. Unit-Key Generation, Content Decryption, and Playback Processing]

Next, a description is given of unit-key generation, content decryption, and playback processing of an information processing apparatus (playback apparatus) for executing content playback. The unit key is used for content decryption and playback. As described above, when hash values are set for decrypted data (plaintext), it is necessary to generate the unit key to decrypt hash units during verification processing based on hash values. Details of the unit-key generation, content decryption, and playback processing will be described in detail with reference to FIGS. 25 and 26.

First, the content verifying means of the information processing apparatus, unit-key generation and content decryption processing executed by the content playback means, and content playback processing executed by the content playback means will be described with reference to FIG. 25. First, an information processing apparatus (playback apparatus) for executing unit-key generation, content decryption, and playback processing reads a device key 776 stored in a memory. The device key 776 is a secret key stored on an information processing apparatus having a license of content use.

Next, in step S601, the device key 776 is used to execute decryption processing of an MKB 781, which is a cryptographic key block containing a media key Km stored on an information storage medium 780, to obtain the media key Km.

The MKB 781 is a key information block that allows a media key (Km), which is required for content decryption, to be obtained only through processing (decryption) based on a device key stored on the information processing apparatus of a user having a valid license. As described above, the MKB 781 allows the key to be obtained only when a user device (information processing apparatus) has a valid license, based on an information distribution system according to a so-called "hierarchical tree structure", and can prevent a user device that has been disabled (that has been subjected to revoking processing) from obtaining the key (media key). By changing key information contained in the MKB, the management center can generate an MKB having a structure in which decryption cannot be performed with a device key stored in a specific user device, i.e., a media key required for content decryption cannot be obtained. Thus, it is possible to exclude (revoke) an authorized device at an arbitrary timing and to supply a decryptable encrypted content to a device having a valid license.

Next, in step S602, based on the media key Km obtained in the MKB processing in step S601 and a physical index 782 read from the information storage medium 780, cryptographic processing (AES_GD) is performed to generate a unit-key generation key (embedded key). This key generation processing is executed, for example, according to an AES cryptographic algorithm. In FIG. 25, AES_D represents decryption (decryption) processing using AES cryptographic processing, AES_GD represents key-generation (key generation) processing involving data decryption processing using AES cryptographic processing, and AES_GE represents key generation (key generation) processing involving data cryptographic processing using AES cryptographic processing.

Next, in step S603, based on the unit-key generation processing Ke (embedded key) and content use control information (copy/playback control information (CCI)) 783 read from the information storage medium 780, cryptographic processing (AES_GD) is performed to generate a control key Kc. In step S604, based on the control key Kc and content hashes 784 read from the information storage medium 780, cryptographic processing (AES_GD) is performed to generate a content hash key Kh. The content hashes 784 are hash values based on data included in a content or encrypted content stored on the information storage medium.

Next, in step S605, using the content hash key Kh, decryption (AES_D) is performed on an encrypted unit key Enc (Ku) 785, read from the information storage medium 780, to obtain a unit key Ku. In this example, the unit key stored on the information medium 780 is stored as encrypted data based on the content hash key Kh generated by a process similar to the process in steps S601 to S604 shown in FIG. 25.

The encrypted unit key Enc (Ku) 785 recorded on the information storage medium 780 is defined for each CPS unit and the unit key Ku generated in step S605 is also defined for each CPS unit. A CPS unit key Ku (i) generated is set so as to correspond to a CPS unit corresponding to a content to be played back, i.e., a CPS unit (i) selected from CPS units 1 to n stored on the information storage medium 780.

During decryption of an encrypted content, first, in step S606, a block seed is retrieved from an encrypted content 406 read from the information storage medium 780 and data selection of a decryption-processing portion (encrypted data) that requires decryption processing and a non-decryption-processing portion (plaintext data) that does not require decryption processing is performed.

The block seed is cryptographic key generation information set so as to correspond to a block, which is unit of encryption processing. Content data contained in a CPS unit is encrypted using a block key Kb that differs for each block having a predetermined data length. During decryption, a block key Kb serving as a decryption processing key for each block is generated through cryptographic processing (S607: AES_GE) based on the block seed and a CPS unit key Ku set so as to correspond to data of each block, and decryption processing (S608) is performed using the generated block key Kb.

The block key Kb is used to decrypt the encrypted content for each encryption processing unit having a predetermined size. The size of the encryption processing unit may contain, for example, 6144-byte user data or 2048-byte user data.

In step S609, non-encrypted data, such as a block seed portion contained in the encrypted content, and data decrypted in step S608 are coupled, so that decrypted data (CPS unit) 777 is output.

A specific example of cryptographic processing executed in steps S602 to S605 and S607 is described with reference to FIG. 26. In step S26, an AES decryption unit (AES_D) 791 is a decryption processing unit, for example, in an AES/ECB-mode having a 128-bit key length, and an AES encryption unit (AES_E) 793 is an encryption processing unit, for example, in an AES/ECB-mode having a 128-bit key length. An exclusive disjunction unit 792 is an operation unit for performing exclusive disjunction (XOR) processing between two bit-strings having the same length.

Figure 25:
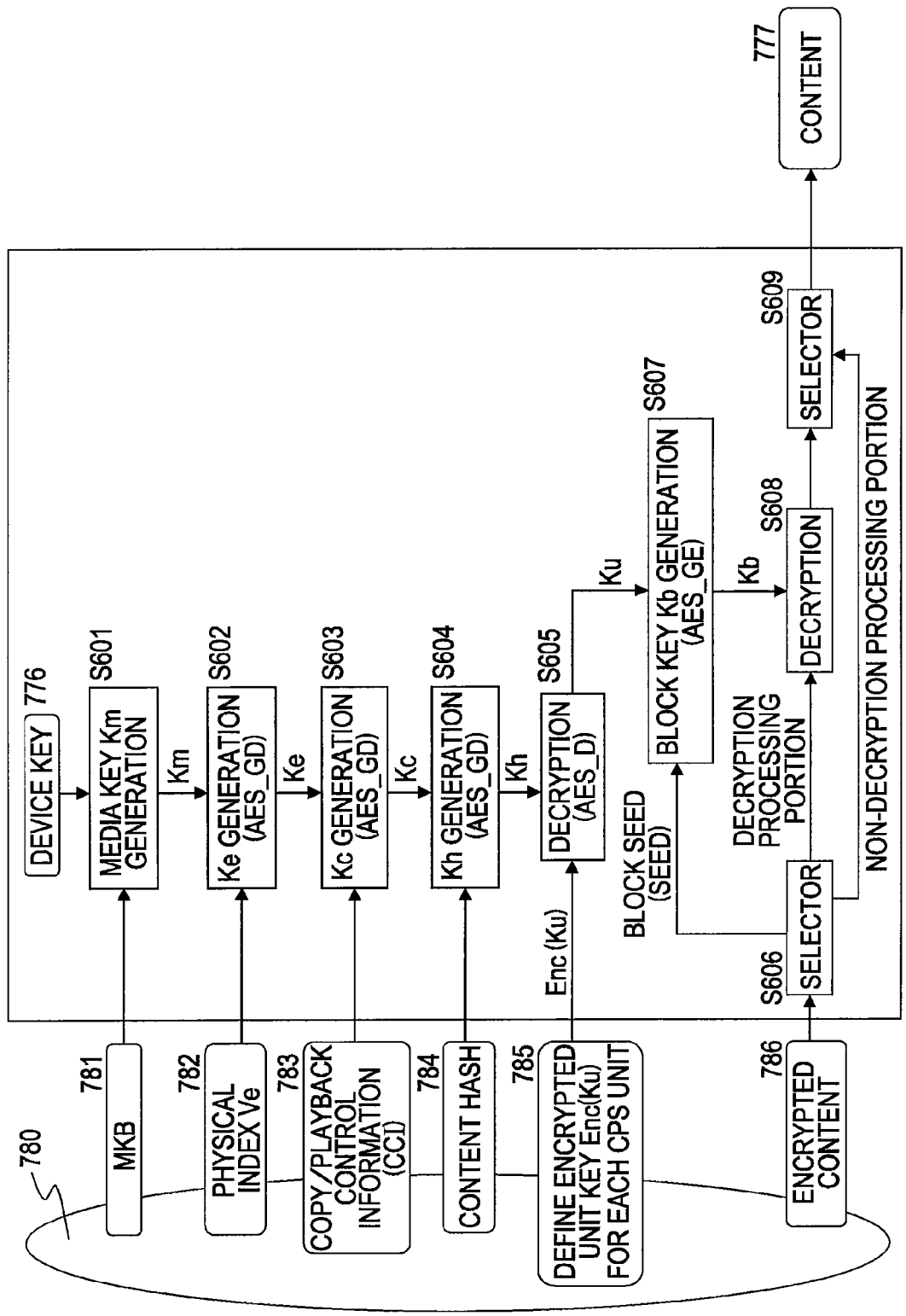
FIG. 25 is a diagram illustrating an encryption processing sequence for content playback performed by the information processing apparatus.

In the generation processing (AES_GD) of the unit key generation key Ke in step S602 shown in FIG. 25, specifically, as shown in FIG. 26(a), the physical index stored on the information storage medium 780 is input to the AES decryption unit 791 and is decrypted using a media key, obtained from an MKB, by using an AES (advanced encryption standard) cryptographic algorithm, which is an common key cryptographic system. In addition, an output value from the AES decryption unit 791 and the physical index data are input to the exclusive disjunction unit 792 and a resulting value of execution of exclusive disjunction is processed as the unit generation key Ke.

Figure 26:
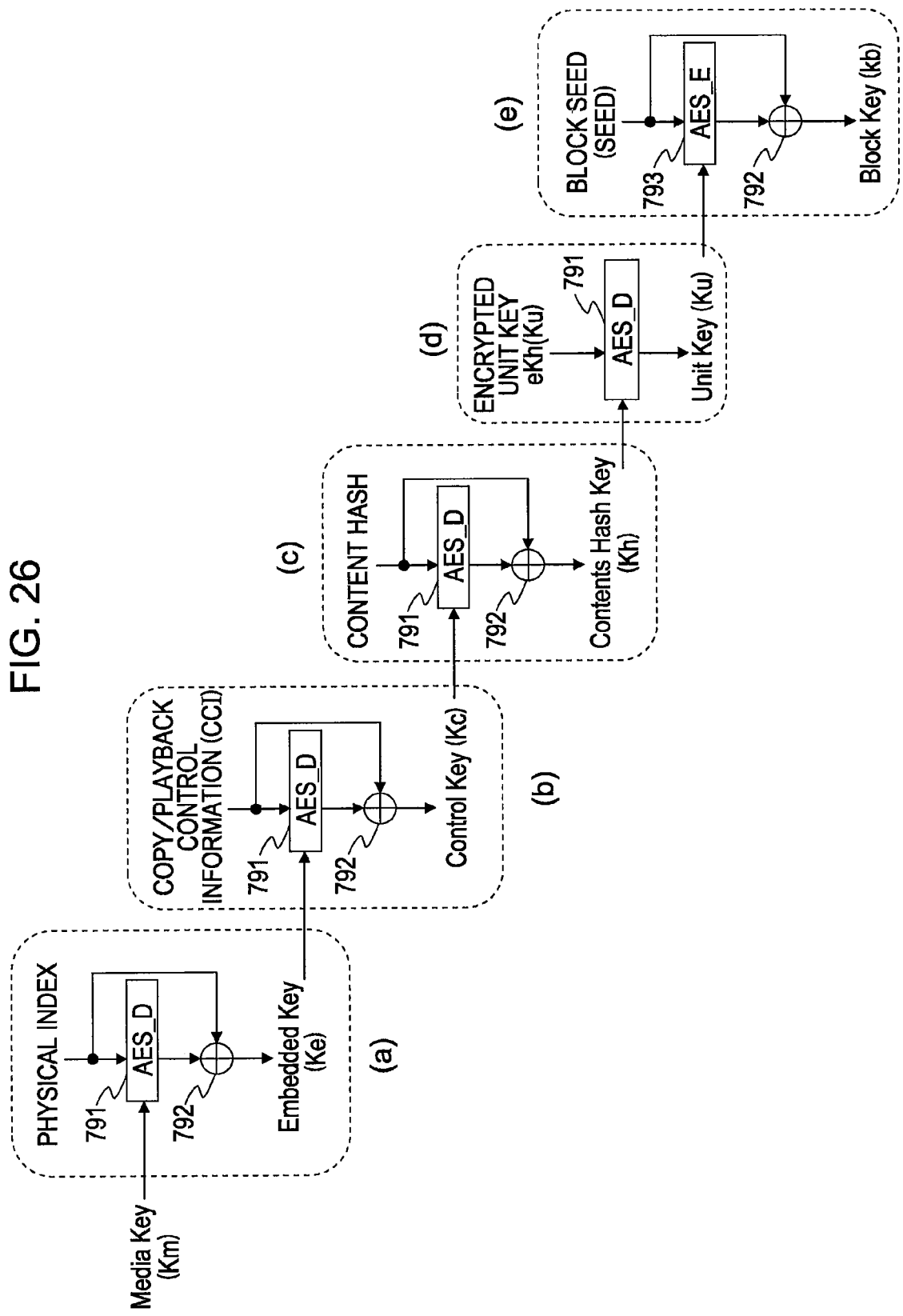
FIG. 26 is a diagram illustrating details of cryptographic processing, such as key generation, used for content playback performed by the information processing apparatus.

The generation of the control key Kc in step S603 shown in FIG. 25 and the generation of the content hash key in step S604 are also performed through operations of AES decryption units 791 and exclusive disjunction units 792, as shown in FIGS. 26(b) and (c). As shown in FIG. 26(d), the generation of the unit key Ku is executed as processing in which, using the content hash key Kh, an AES decryption unit 791 decrypts an encrypted unit key eKh (Ku) obtained from the information storage medium. The generation of the block key Kb in step S607 shown in FIG. 26 is performed through operations of an AES decryption unit 793 and an exclusive disjunction unit 792, as shown in FIG. 26(e).

Although the description in this embodiment is given of an example in which an AES cryptographic algorithm is used to generate key data having a 128-bit key length, the algorithm and the key length are not limited to the examples and thus another algorithm and another key length can also be used.

As described above, the unit key used for content (CPS unit) decryption processing is generated using various types of information. When the hash value verification is executed based on plaintext data, decryption processing of hash units selected in accordance with the process described with reference to FIG. 25 is performed, hash values based on the decoded data are then determined, and the determined hash values are compared with comparison hash values contained in the content hash table (CHT).

[7. Configuration Example of Information Processing Apparatus]

Next, a configuration example of an information processing apparatus for performing recording processing or playback processing on a main-content and a sub-content having the above-described content management unit (CPS unit) configuration will be described with reference to FIG. 27.

An information processing apparatus 800 includes a drive 890 that drives an information storage medium 891 and inputs/outputs a data recording/playback signal, a CPU 870 that executes data processing in accordance with various programs, and a ROM 860 and a memory 880 that serve as storage areas for programs, parameters, and so on. The information processing apparatus 800 further includes an input/output I/F 810 that inputs/outputs a digital signal and an input/output I/F 840 that inputs/outputs an analog signal and that has an A/D-D/A converter 841. The processing apparatus 800 further includes an MPEG codec 830 that executes encoding/decoding processing of MPEG data, TS and PS processing means 820 that executes TS (transport stream) and PS (program stream) processing, and cryptographic processing means 850 that executes various types of cryptographic processing. The individual blocks are connected to a bus 801.

First, an operation during data recording will be described. Two cases in which a digital signal is input and an analog signal is input are possible with respect to data to be recorded.

In the case of a digital signal, the digital signal is input via the digital-signal input/output I/F 810, and is subjected to appropriate encryption processing by the cryptographic processing means 850, as needed. The resulting data is further stored on the information storage medium 891. When an input digital signal is stored after the data format is converted, the MPEG codec 830, the CPU 870, and the TS and PS processing means 820 converts the data format into a data format for storage. Thereafter, the cryptographic processing means 850 performs appropriate encryption processing on the data and stores the resulting data on the information storage medium 891.

In the case of an analog signal, the analog signal input to the input/output I/F 840 is converted into a digital signal by the A/D converter 841 and the MPEG codec 830 converts the digital signal into a codec format used during recording. Thereafter, the TS and PS processing means 820 converts the digital signal into AV multiplexed data, which has a recording data format. The AV multiplexed data is subjected to appropriate encryption processing by the cryptographic processing means 850, as needed. The resulting data is stored on the storage medium 891.

For example, when a main content including AV stream data containing MPEG-TS data is to be recorded, the main content is segmented into content management units (CPS units), which are then subjected to encryption processing by the cryptographic processing means 850 using unit keys and are recorded to the storage medium 891 via the drive 890.

The sub-content is also segmented into content management units (CPS units) corresponding to data groups, which are then subjected to encryption processing by the cryptographic processing means 850 using unit keys and are recorded to the storage medium 891 via the drive 890.

Next, processing for a case in which data from the information storage medium is played back will be described. For example, in a case in which AV stream data including MPEG-TS data serving as a main content is to be played back, when data read from the information storage medium 891 by the drive 890 is identified as a content management unit, processing for obtaining a unit key corresponding to the content management unit is executed. Then, based on the obtained unit key, the cipher is solved by the cryptographic processing means 850, and the resulting data is divided into video data, audio, subtitle data, and so on by the TS (transport system) and PS (program stream) processing means 820.

Digital data decrypted by the MPEG codec 830 is converted into an analog signal by the D/A converter 841 in the input/output I/F 840 and the analog signal is output. When digital output is to be performed, MPEG-TS data decrypted by the cryptographic processing means 850 is output as digital data through the input/output I/F 810. In this case, the data is output to an IEEE 1394 or Ethernet cable or a digital interface, such as a wireless LAN. For a network connection function, the input/output I/F 810 has a function for network connection. When the playback apparatus converts data into a format receivable by output-destination equipment and outputs the data, the MPEG codec 830 performs rate conversion processing and codec conversion processing on the video, audio, and subtitles, and so on temporarily multiplexed by the TS and PS processing means 820. The TS and PS processing means 820 then outputs data, multiplexed into the MPEG-TS or MPEG-PS, via the digital input/output I/F 810. Alternatively, the arrangement can be such that, using the CPU 870, data is converted into a codec file or multiplexed file other than an MPEG file and is output via the digital input/output I/F 810.

For a sub-content, when the sub content is identified as a content management unit, processing for obtaining a unit key corresponding to the content management unit is executed and, based on the obtained unit key, the cipher is deciphered by the cryptographic processing means 850 and playback processing is executed. Key information for each content management unit (CPS unit) required for performing playback can be obtained from data stored in the memory 880. When the unit key is not stored on the information storage medium, it is possible to obtain it by executing a predetermined procedure through a networked server.

As described above, each content management unit (CPS unit) is associated with one unit key. A playback application program for comprehensively executing playback control of content playback detects switching of content management units (CPS units), and executes switching of keys used, in response to the switching. When the key has not been obtained, processing for presenting a message prompting key obtaining is executed.

When the recording/playback apparatus obtains necessary information through a network outside the apparatus, the obtained data is stored in the memory 880 in the recording/playback apparatus. The stored data include key information required for content playback, subtitles to be played back in conjunction with the content playback, audio (audio) information, data such as still images, content management information, and playback-apparatus operating rules (usage rules) corresponding to the content management information.

A program for executing playback processing and recording processing is stored in the ROM 860. During execution processing of the program, the memory 880 is used to store parameters and data and to serve as a work area. Although the description for FIG. 27 has been given using the apparatus configuration that can perform data recording and playback, an apparatus having only a playback function or an apparatus having only a recording function can also be configured and the present application is also applicable to the apparatuses.

The present application has been described above in detail with reference to the particular embodiment. However, it is obvious that those skilled in the art can make a modification and substitution to the embodiment in a scope without departing from the substance of the present application. That is, the present application has been disclosed by way of example and thus should not be construed as limiting. The scope of the claims should be construed in order to understand the substance of the present application.

The series of processing described herein can be executed by hardware, software, or a combined configuration thereof. When the processing is executed with software, it can be executed by loading a program, in which the processing sequence is recorded, into an in-computer memory built into dedicated hardware or installing the program onto a general-purpose computer that is capable of performing various types of processing.

For example, the program can be pre-stored on a storage medium, such as a hard disk or a ROM (read only memory). Alternatively, the program can be temporarily or permanently stored (recorded) on a removable storage medium, such as a flexible disc, a CD-ROM (compact disc read only memory), an MO (magneto optical) disc, a DVD (digital versatile disc), a magnetic disk, or a semiconductor memory. Such removable storage media can be supplied as the so-called "package software".

In addition to installing the program from the above-described removable storage media onto a computer, the program can be wirelessly transferred from a download site to the computer or can be transferred to the computer by a wired connection through a network such as a LAN (local area network) and/or the Internet, so that the program transferred in such a manner is received by the computer and is stored on a storage medium such as a built-in hard disk.

The various types of processing described herein not only include processing that is time-sequentially executed according to the described sequence but also include processing that is concurrently or individually executed according to the throughput of an apparatus that executes the processing or according to need. The term "system" herein refers to a logical combination of a plurality of apparatuses and is not limited to a system in which individual apparatus are included in the same housing.

Industrial Applicability

As described above, according to the configuration of the present application, hash values are determined for respective hash units set as segmented data of a content stored on an information storage medium and the determined hash values are recorded in content hash tables and are stored on the information storage medium together with the content. An information processing apparatus for executing content playback executes hash-value comparison processing based on one or more hash units randomly selected from a large number of hash units. Thus, regardless of the data amount of the content, it is possible to determine hash values based on hash units whose amount of data is set to be small and it is possible to perform content verification through comparison processing. This configuration eliminates the need to enhance the data processing capability of user equipment that executes content playback, reduces the period of verification processing time until a content is played back, and makes it possible to efficiently verify the content.

In addition, according to the configuration of the present application, each hash unit is set to have an integral multiple of the data length of data of an ECC block, which is a unit of data reading of the information processing apparatus for executing content playback. Thus, the hash-unit reading can be realized by reading a smaller amount of data and data can be verified with high processing efficiency.

It should be understood that various changes and modifications to the presently preferred embodiments described herein will be apparent to those skilled in the art. Such changes and modifications can be made without departing from the spirit and scope of the present application and without diminishing its intended advantages. It is therefore intended that such changes and modifications be covered by the appended claims.

The invention claimed is:

1. An information processing apparatus for executing processing for playing back a content from an information storage medium, the information processing apparatus including:

content verifying hardware processor configured to verify legitimacy of the content; and content playback hardware processor configured to execute content playback processing, provided that the legitimacy of the content has been confirmed based on the verification performed by the content verifying hardware processor;

wherein the content verifying hardware processor has a configuration for executing content verification processing in which the legitimacy of the content is confirmed provided that:

n hash units (where n is an integer of 1 or greater) set as segmented data of the content recorded on the information storage medium are randomly selected from all hash units stored on the information storage medium;

hash values determined based on the selected hash units are compared with comparison hash values stored on the information storage medium, which includes a plurality of content hash tables in which the comparison hash values are recorded, wherein each of the plurality of content hash tables is set for a recording layer of the information storage medium; and the hash values of all the selected n hash units match the comparison hash values, and wherein the content verifying hardware processor determines, for each of the n hash units, a content management unit to which the selected hash unit belongs based on a hash unit number of the selected hash unit.

2. The information processing apparatus according to claim 1, wherein the content verifying hardware processor obtains the number (HN) of hash units, stored on the information storage medium, from data recorded in a content hash table stored on the information storage medium; randomly selects a numeric value x, where≤HN; and associates the selected numeric value x with a hash unit number of the hash unit stored on the information storage medium to execute processing for selecting the hash unit to be subjected to the comparison processing.

3. The information processing apparatus according to claim 1, wherein the content verifying hardware processor has a configuration for executing processing for determining hash values based on hash units that are data included in an encrypted content stored on the information storage medium.

4. The information processing apparatus according to claim 1, wherein the content verifying hardware processor executes processing for decrypting the selected hash units, executes determination of hash values based on the decrypted hash units, and executes processing for comparing the determined hash values with the comparison hash values stored on the information storage medium.

5. The information processing apparatus according to claim 4, wherein, for the decryption processing of each of the selected hash units, the content verifying hardware processor obtains a unit key corresponding to the content management unit to which the selected hash unit belongs and executes decryption processing using the unit key.

6. A non-transitory information storage medium storing a configuration of data comprising a content and hash values for hash units, which when processed by a content playback apparatus, is configured to cause the content playback apparatus to:

provide a confirmation of the legitimacy of the content when:

n hash units (where n is an integer of 1 or greater) set as segmented data of the content recorded on the information storage medium are randomly selected from all hash units stored on the information storage medium;

comparison hash values stored on the information storage medium, which includes a plurality of content hash tables in which the comparison hash values are recorded and each of the plurality of content hash tables is set for a recording layer of the information storage medium, are compared with hash values determined based on the selected hash units; and the comparison hash values match the hash values of all the selected n hash units.

7. The non-transitory information storage medium according to 6, wherein a logical size of the hash unit is set to an integral multiple of a data length of an ECC block, which is a unit of data reading of an information processing apparatus for executing playback of the content.

8. The non-transitory information storage medium according to claim 7, having a configuration in which the content is segmented into clip files which are content files, and of data included in the clip files, positions of at least front-end data of the clip files are recorded so as to match positions of front ends of the ECC blocks.

9. A content management system having a configuration comprising:

a management center information processing apparatus configured to supply management information for content use management;

a content editing entity information processing apparatus configured to perform content editing processing; and an information-storage-medium manufacturing entity information processing apparatus configured to receive an edited content from the content editing entity information processing apparatus and recording the content to an information storage medium;

wherein at least one of the content editing entity information processing apparatus and the information-storage-medium manufacturing entity information processing apparatus:

stores generated recording data in a buffer, determines hash values for hash units, when the data stored in the buffer reached a predetermined amount of data for a hash unit, based on the data stored in the buffer, wherein the hash units are segmented data of the content stored on the information storage medium, and generates, as data to be stored on the information storage medium, a plurality of content hash tables in which the determined hash values are recorded, wherein each of the plurality of content hash tables is set for a recording layer of the information storage medium.

10. The content management system according to claim 9, wherein at least one of the content editing entity information processing apparatus and the information-storage-medium manufacturing entity information processing apparatus has a configuration for generating, data to be stored on the information storage medium, a content certificate in which a hash digest value is recorded, the hash digest value being determined based on the hash values contained in the content hash tables.

11. The content management system according to claim 10, wherein at least one of the content editing entity information processing apparatus and the information-storage-medium manufacturing entity information processing apparatus has a configuration for generating an electronic signature based on the data contained in the content certificate and executing processing for attaching the electronic signature to the content certificate.

12. A data processing method for generating data to be recorded to an information storage medium, the data processing method including:
- a recording-data generating step of executing recording-data generation processing for each of a plurality of sectors;
- a step of storing the generated recording data in a buffer;
- a hash-value determining step of determining, when the data stored in the buffer reaches a predetermined amount of data for a hash unit, a hash value based on the data stored in the buffer;
- a step of setting the hash value of each hash unit as data to be recorded to the information storage medium, the hash value being determined in the hash-value determining step; and
- a step of generating a plurality of content hash tables in which the hash values of the hash units determined in the hash-value determining step are stored, wherein each of the plurality of content hash tables is set for a recording layer of the information storage medium.

13. The data processing method according to claim 12, further including:
- a content-certificate generating step of generating, as data to be stored on the information storage medium, a content certificate in which a hash digest value determined based on the hash values stored in the content hash table is recorded.

14. The data processing method according to claim 13, wherein the content-certificate generating step includes processing for generating an electronic signature based on data stored in the content certificate and attaching the electronic signature to the content certificate.

15. The data processing method according to claim 12, further including in the recording-data generating step:
- determining information including whether encryption is required for each sector based on an auxiliary file in which a data processing mode for each sector is written, and
- performing data processing in accordance with determined information to generate recording data for each sector.

16. A data processing method for executing processing for playing back a content from an information storage medium, the data processing method including:
- a content verifying step of verifying legitimacy of the content; and
- a content playback step of executing content playback processing, provided that the legitimacy of the content has been confirmed based on the verification performed in the content verifying step;
- wherein the content verifying step includes a step of executing content verification processing in which the legitimacy of the content is confirmed provided that:
  - n hash units (where n is an integer of 1 or greater) set as segmented data of the content recorded on the information storage medium are randomly selected from all hash units stored on the information storage medium;
  - hash values determined based on the selected hash units are compared with comparison hash values stored on the information storage medium, which includes a plurality of content hash tables in which the comparison hash values are recorded, wherein each of the plurality of content hash tables is set for a recording layer of the information storage medium; and
  - the hash values of all the selected n hash units match the comparison hash values, and
- wherein the content verifying step determines, for each of the n hash units, a content management unit to which the selected hash unit belongs based on a hash unit number of the selected hash unit.

17. The data processing method according to claim 16, wherein the content verifying step includes a step of obtaining the number (HN) of hash units, stored on the information storage medium, from data recorded in a content hash table stored on the information storage medium; of randomly selecting a numeric value x, where x≤HN; and of associating the selected numeric value x with a hash unit number of the hash unit stored on the information storage medium to execute processing for selecting the hash unit to be subjected to the comparison processing.

18. The data processing method according to claim 16, wherein the content verifying step includes a step of executing processing for determining hash values based on hash units that are data included in an encrypted content stored on the information storage medium.

19. The data processing method according to claim 16, wherein the content verifying step includes a step of executing processing for decrypting the selected hash units, executing determination of hash values based on the decrypted hash units, and executing processing for comparing the determined hash values with the comparison hash values stored on the information storage medium.

20. The data processing method according to claim 19, wherein, for the decryption processing of each of the selected hash units, the content verifying step includes a step of obtaining the unit key corresponding to a content management unit to which the selected hash unit belong and of executing decryption processing using the unit key.

21. A non-transitory computer readable storage medium storing a computer program for causing a computer to execute processing for generating data to be recorded to an information storage medium, the computer program causing the computer to perform:
- a recording-data generating step of executing recording-data generation processing for each of a plurality of sectors;
- a step of storing the generated recording data in a buffer;
- a hash-value determining step of determining, when the data stored in the buffer reaches a predetermined amount of data for a hash unit, a hash value based on the data stored in the buffer;
- a step of setting the hash value of each hash unit as data to be recorded to the information storage medium, the hash value being determined in the hash-value determining step; and
- a step of generating a plurality of content hash tables in which the hash values of the hash units determined in the hash-value determining step are stored, wherein each of the plurality of content hash tables is set for a recording layer of the information storage medium.

22. A non-transitory computer readable storage medium storing a computer program for causing a computer to execute processing for playing back a content from an information storage medium, the computer program causing the computer to perform:
- a content verifying step of verifying legitimacy of the content; and
- a content playback step of executing content playback processing, provided that the legitimacy of the content has been confirmed based on the verification performed in the content verifying step;

wherein the content verifying step includes a step of executing content verification processing in which the legitimacy of the content is confirmed provided that:
- n hash units (where n is an integer of 1 or greater) set as segmented data of the content recorded on the information storage medium are randomly selected from all hash units stored on the information storage medium;
- hash values determined based on the selected hash units are compared with comparison hash values stored on the information storage medium, which includes a plurality of content hash tables in which the comparison hash values are recorded, wherein each of the plurality of content hash tables is set for a recording layer of the information storage medium; and
- the hash values of all the selected n hash units match the comparison hash values, and wherein the content verifying step determines, for each of the n hash units, a content management unit to which the selected hash unit belongs based on a hash unit number of the selected hash unit.

\* \* \* \* \*